United States Patent
Miiyamoto et al.

(10) Patent No.: US 8,057,934 B2
(45) Date of Patent: Nov. 15, 2011

(54) NICKEL ELECTRODE FOR ALKALINE SECONDARY BATTERY AND ALKALINE SECONDARY BATTERY

(75) Inventors: Masaki Miiyamoto, Kyoto (JP); Mitsuhiro Kodama, Kyoto (JP); Seijiro Ochiai, Kyoto (JP); Manabu Kanemoto, Kyoto (JP); Kaori Nishiyabu, Fukuoka (JP); Minoru Kuzuhara, Kyoto (JP); Masaharu Watada, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 991 days.

(21) Appl. No.: 11/793,203

(22) PCT Filed: Dec. 16, 2005

(86) PCT No.: PCT/JP2005/023689
§ 371 (c)(1),
(2), (4) Date: Jun. 18, 2007

(87) PCT Pub. No.: WO2006/064979
PCT Pub. Date: Jun. 22, 2006

(65) Prior Publication Data
US 2008/0166635 A1    Jul. 10, 2008

(30) Foreign Application Priority Data

Dec. 17, 2004 (JP) ................. 2004-365178
Feb. 1, 2005 (JP) ................. 2005-025692

(51) Int. Cl.
*H01M 4/52* (2010.01)
*H01M 4/32* (2006.01)

(52) U.S. Cl. .................................................. 429/223
(58) Field of Classification Search ............ 429/223; 29/623.1
See application file for complete search history.

(56) References Cited

U.S. PATENT DOCUMENTS

| 6,251,538 B1 * | 6/2001 | Seyama et al. ............ 429/223 |
| 2004/0241545 A1 | 12/2004 | Ochiai et al. |

FOREIGN PATENT DOCUMENTS

| JP | 2000-223119 | 8/2000 |
| JP | 2000-294234 | 10/2000 |
| JP | 2001-006679 | 1/2001 |
| JP | 2001-052694 | 2/2001 |
| JP | 2002-279992 | 9/2002 |
| JP | 2004-259515 | 9/2004 |

OTHER PUBLICATIONS

IPDL Machine Translation of the Claims and Detailed Description of JP 2001-052694A (Feb. 23, 2001).*

* cited by examiner

*Primary Examiner* — Gregg Cantelmo
(74) *Attorney, Agent, or Firm* — Manabu Kanesaka

(57) ABSTRACT

A nickel electrode for an alkaline secondary battery includes an electrically conductive base plate, and an active material particle supported on the conductive base plate and including a complex particle with a surface layer that mainly formed of a high-order cobalt compound whose oxidation number of cobalt is higher than +2 on a surface of a core layer particle that forms a high-order nickel hydroxide whose oxidation number of nickel is higher than +2. Lithium (Li) is contained to be a solid solution in the active material particle from 0.01 to 0.5 wt % of a converted amount as a lithium metal by weight of lithium metal divided by a total weight of the high-order nickel hydroxide, the high-order cobalt compound and the lithium metal.

11 Claims, 5 Drawing Sheets

NICKEL ELECTRODE FOR ALKALINE SECONDARY BATTERY AND ALKALINE SECONDARY BATTERY

TECHNICAL FIELD

The present invention relates to a nickel electrode for alkaline secondary battery and an alkaline secondary battery whose positive electrode is the nickel electrode and, more particularly, to a nickel electrode and alkaline secondary battery whose discharge capacity is larger compared to the conventional products, with excellent cycle characteristic.

BACKGROUND TECHNOLOGY

In recent years, there has been a tendency of a rapid increase in electrically-powered equipment such as hybrid electric vehicle and electric power tools which require high rate discharge. As the electric source of the equipment, alkaline secondary batteries such as nickel metal-hydride batteries and nickel-cadmium batteries are widely used. As an active material for the nickel electrode, powder of high density nickel hydroxide $\{Ni(OH)_2\}$ is extracted via amine complex salt to reduce the self-discharge. Also, by adding solid solution of zinc (Zn) to nickel hydroxide, the formation of $\gamma$-NiOOH is inhibited. Furthermore, some modifications such as the charge efficiency improvement by inhibiting the generation of oxygen at the nickel electrode during charging through the forming of cobalt (Co) solid solution have been studied.

Also, for the secondary battery electrodes which use particles with poor conductivity such as metal oxides and hydroxides, it is a common method to improve the current collection function inside the battery plate by mixing the electrical conductive material such as a carbon powder or metal powder with the active material particle and then supporting the compound in the base plate. As for the nickel electrode for alkaline secondary battery, a method of building up an electrically conductive network is used by consisting of high-order cobalt compound in the aggregation of the active particle that consists of $Ni(OH)_2$ and high-order nickel compound supported in the base plate in order to raise the active material packing density and secure the current collection function.

The electrically conductive network consisting of the aforementioned high-order cobalt compound can be formed by adding divalent cobalt compound such as cobalt monoxide $\{CoO\}$ or cobalt hydroxide $\{Co(OH)_2\}$, and the like to an active material powder that consists of nickel hydroxide, and forming a cobalt hydroxide layer on the surface of the core layer particle that mainly consists of $Ni(OH)_2$, then assembling the alkaline secondary battery using a nickel plate filled with the active material powder on the base plate, and then generating a high-conductive and high-order cobalt compound with an oxidation of aforementioned cobalt compound whose oxidation number of cobalt is +2 by charging.

However, this method has a defect that the discharge capacity of the battery will decrease due to the increased amount of the discharge reserve production. In order to eliminate the defect, for example, a method has been proposed that forming a layer of $Co(OH)_2$ on the surface of the core layer particle that mainly consists of nickel hydroxide, then oxidizing the active material powder with oxidant in the existence of alkaline solution, then turning the aforementioned cobalt compound on the surface layer to high-conductive and high-order cobalt compound before embedding it into a battery, and furthermore, increase the oxidation number of Ni higher than +2 by oxidizing a part of the $Ni(OH)_2$ at the core layer. Although this method is able to decrease the discharge reserve, it has been quite difficult to increase the capacity of the nickel electrode itself or the charge efficiency.

As a reforming method of the active material for a nickel electrode (hereinafter referred simply as "active material", too), one method is proposed by adding of alkaline metal (for example, Li) to the active material. It is reported that the capacity decay during the overdischarge can be inhibited by adding an alkaline solution containing $Li^+$ to the active material which containing Zn and the like under the solid solution state, and then heating-up the system. In particular, an example is reported that adding the mixture solution of NaOH and LiOH to the mixture powder of hydrated nickel powder containing 2 mol % of zinc solid solution and $Co(OH)_2$ powder and then heating-up at 100° C. under the atmosphere. (See Patent Reference 1 as an example.)

Patent Reference 1: Japanese Published Unexamined Application No. H8-148146 (page 4, paragraph 0029 and page 6, paragraph 0044)

However, in the method described in Patent Reference 1, as Li is not incorporated into $Ni(OH)_2$ particles, it would not result in increase of $Ni(OH)_2$ capacity per unit weight (mAh/g, hereinafter referred simply as "capacity density"). The reason maybe due to that Li is not captured in $Ni(OH)_2$.

When it is charged up to the high oxidation state such as 3.5 oxidation number of nickel, in order to prevent positive electrode inflation by inhibiting generation of $\gamma$-NiOOH, for example, a nickel hydride battery equipped with a positive electrode which has an active material as a nickel hydroxide solid solution comprising at least one kind of transition metal and at least one kind of alkaline metal is proposed, and the preferable solid solution amount is 2 to 10 atomic % (atm %) of transition metal 5 to 10 atm % of alkaline metal against Ni of $Ni(OH)_2$. (See Patent Reference 2 as an example.)

Patent Reference 2: Japanese Published Unexamined Application No. H10-289715 (page 3, paragraph 0017)

According to the description of Patent Reference 2, it is possible to improve the capacity density because it can be charged to the high oxidation number of Ni that is contained in the active material; however, it has a deficit such as an insufficient cycle characteristic.

Also, an active material for alkaline secondary battery that mainly consists of $Ni(OH)_2$, having nickel hydroxide whose Ni valence is higher than divalent, having high-order cobalt compound containing the first alkaline cation on the surface of nickel hydroxide, and a positive electrode containing the nickel hydroxide whose valence is higher than the aforementioned divalent and containing the second alkaline cation has been proposed. (See Patent Reference 3 as an example.)

Patent Reference 3: Japanese Published Unexamined Application No. 20000-223119 (page 5, paragraph 0026-0027)

According to the description of Patent Reference 3, it can prevent peeling-off of the compound of high-order nickel hydroxide and high-order cobalt each other, and as the electrical conductivity of the positive electrode can be kept in a higher level, the utilization rate of the active material can be improved. For example, a type of nickel hydroxide compound that contains about 0.2 wt % of sodium ion and a type of nickel hydroxide compound that contains about 0.7 wt % of lithium ion are reported. However, in the method stated in Patent Reference 3, although the electrical conductibility would be increased, there is a tendency to deteriorate the charge/discharge cycle characteristic maybe because of the excessive lithium ion in the active material, and also as for cobalt compound, it only reports the one containing sodium ion but lithium ion.

Also, when the alkaline solution containing LiOH for the reaction bath is used in the process of oxidation treatment to oxidize a raw material powder consisting of $Co(OH)_2$ and $Ni(OH)_2$, which is reported that $Li^+$ penetrates into the powder or adheres to the surface, resulting in obtaining a material with a high utilization rate. And then, it is reported that the concentration of alkaline solution is preferably 1 mol/l (1M/l) or higher. (See Patent Reference 4 as an example.)

Patent Reference 4: Japanese Published Unexamined Application No. 2002-110154 (page 5, paragraph 0032)

According to the method stated in Patent Reference 4, the utilization rate of the active material can be improved; however, in this method, even in normal charging condition, it has a tendency be overcharged, possibly due to the fact that the Li content ratio in the active material of nickel electrode is not controlled. Therefore, same as aforementioned Patent Reference 3, there is a tendency to deteriorate the charge/discharge cycle characteristic.

Also, at the nickel electrode that contains nickel hydroxide and cobalt hydroxide as an active material, when a lithium compound that consists of a salt of strong acid and strong base, or a salt of weak acid and strong base is added to the active material, lithium ion is incorporated into the nickel hydroxide crystal lattice, and by increasing the lattice defect, electron transfer would be accelerated and electrical conductibility would be improved. Also, the generation of the poor charge/discharge reversible γ-NiOOH would be inhibited, resulting in an improved utilization rate of the active material. (See Patent Reference 5 as an example.)

Patent Reference 5: Japanese Published Unexamined Application No. 2001-6679 (page 3, paragraph 0014)

However, in the Patent Reference 5, as an active material particle has not been previously oxidized and then Li might be difficult to be fixed in the active material particle during the addition of Li to the active material, when the utilization rate of the active material at 288 mAh per gram of the active material particle is 100%, the obtained highest utilization rate of the active material is just 100%, which is not necessarily satisfactory in the viewpoint of achieving a high capacity

DISCLOSURE OF THE INVENTION

Problems to be Resolved by the Invention

The present invention was made to resolve the above-mentioned problems, to provide a nickel electrode for alkaline secondary battery and alkaline secondary battery with high charge/discharge capacity, low irreversible capacity, and also superior in cycle characteristic, high-rate discharging characteristics and charge efficiency. Also, it is aimed to offer a method for the production of a nickel electrode for alkaline secondary battery which is superior in productivity.

Means of Solving the Problems

To resolve the above-mentioned problems, the inventors executed in-depth studies and discovered that the nickel electrode and alkaline secondary battery with high capacity density, low irreversible capacity, high-rate discharge characteristics and superior charge/discharge cycle characteristics can be obtained, by making lithium (Li) contained to be a solid solution in the active material particle (mainly consists of nickel hydroxide) in the converted amount of from 0.01 to 0.5 wt % solid solution. Let us remind that solid solution of Li mentioned in the present invention is Li that will not elute out of the active material even the active material particle is rinsed in water. The Li solid solution amount mentioned in the present invention is Li amount contained in the active material after rinsing in water repeatedly until the pH value of the supernatant solution becomes 11.5 or less in the decantation after 100 parts by weight of active material particle is dispersed in the range of 350 to 400 parts by weight of pure water at normal temperature (the range of 5 to 30° C.)

The active material for a nickel electrode in the present invention is obtained when a particle that mainly consists of nickel hydroxide whose oxidation number of Ni is higher than +2 is contacted with LiOH solution, following the adding of Li in the aforementioned active material particle, resulting the active material having Li retention function that Li does not elude out even rinsed in water. Also, we have discovered that by heat-treating of the mixture of a particle that mainly consists of high-order nickel hydroxide whose oxidation number of Ni is higher than +2 and LiOH solution, aforementioned active material particle containing Li can be obtained in a short period of time, which led us to the present invention. Furthermore, instead of the aforementioned LiOH solution, we have discovered that at least one kind of the compound of lithium carbonate, hydrosulfate, nitrate salt, phosphate, halogen compound or acetate can be applied, which led us to the present invention as well. According to the present invention, aforementioned problems can be resolved with the following configuration.

(1) A nickel electrode for an alkaline secondary battery with an electrically conductive base plate supporting an active material particle comprising a particle that mainly consists of high-order nickel hydroxide whose oxidation number of nickel is higher than +2, or a complex particle with a surface layer that mainly consists of a high-order cobalt compound whose oxidation number of cobalt is higher than +2 on the surface of a core layer particle that mainly consists of said high-order nickel hydroxide; wherein lithium (Li) is contained to be a solid solution in said active material particle at 0.01 to 0.5 wt % of the converted amount as a simple.

(2) A nickel electrode for alkaline secondary battery of above described (1), wherein the aforementioned active material particle contains the rare earth element compound comprising at least one kind of element selected from the element group of holmium (Ho), erbium (Er), thulium (Tm), ytterbium (Yb), and lutetium (Lu)

(3) A nickel electrode for alkaline secondary battery of above described (2), wherein the aforementioned rare earth element compound comprising at least one kind of element selected from the element group of holmium (Ho), erbium (Er), thulium (Tm), ytterbium (Yb), and lutetium (Lu) is a compound having inherent diffraction peaks at d=0.88 nm, d=0.84 nm, and d=0.76 nm in the X-ray diffraction using Co—Kα line.

(4) A nickel electrode for alkaline secondary battery of any one of above described (1) to (3), wherein the aforementioned active material particle contains at least one kind element selected from calcium (Ca) and magnesium (Mg).

(5) A nickel electrode for alkaline secondary battery of any one of above described (1) to (4), wherein the aforementioned active material is contained and a natural polysaccharide comprising glucose, mannose and glucuronic acid is contained or a natural polysaccharide comprising glucose, mannose, rhamnose, and glucuronic acid is contained.

(6) A method for the production of a nickel electrode for alkaline secondary battery of any one of above described (1) to (5), wherein lithium (Li) is contained to be a solid solution in a particle that mainly consists of a high-order nickel hydroxide whose oxidation number of nickel is higher than +2, or a complex particle with a surface layer that mainly consists of a high-order cobalt compound whose oxidation number of cobalt is higher than +2 on the surface of the core layer particle that mainly consists of the aforementioned high-order nickel hydroxide by making the particle or complex particle contacted with lithium hydroxide solution.

(7) A method for the production of a nickel electrode for alkaline secondary battery of above described (6), wherein a particle that mainly consists of nickel hydroxide, or a particle with a surface layer that mainly consists of cobalt hydroxide or a high-order cobalt compound whose oxidation number of cobalt is higher than +2 on the surface of the core layer particle that mainly consists of nickel hydroxide, is oxidized with oxidant or electrolytic oxidation, the aforementioned particle that mainly consists of a high-order nickel hydroxide or the aforementioned complex particle is formed, and this is contacted with lithium hydroxide solution.

(8) A method for the production of a nickel electrode for alkaline secondary battery of any one of above described (1) to (5), wherein oxidation of a particle that mainly consists of nickel hydroxide or a particle with a surface layer that mainly consists of cobalt hydroxide or a high-order cobalt compound whose oxidation number of cobalt is higher than +2 on the surface of the core layer particle that mainly consists of nickel hydroxide and impregnation of lithium into the particle are performed in one process by containing lithium hydroxide in a reaction bath in which the particle is oxidized with oxidant or electrolytic oxidation, (9) A method for the production of a nickel electrode for alkaline secondary battery of any one of above described (1) to (5), wherein a paste comprising a particle that mainly consists of the aforementioned high-order nickel hydroxide, or a complex particle with a surface layer that mainly consists of aforementioned high-order cobalt compound on the surface of the core layer particle that mainly consists of aforementioned high-order nickel hydroxide, and lithium hydroxide solution is supported in an electrically conductive base plate.

(10) A method for the production of a nickel electrode for alkaline secondary battery of any one of above described (1) to (5), wherein a paste comprising a particle that mainly consists of the aforementioned high-order nickel hydroxide, or a complex particle with a surface layer that mainly consists of aforementioned high-order cobalt compound on the surface of the core layer particle that mainly consists of aforementioned high-order nickel hydroxide, and solution of at least one kind of the compound of lithium carbonate, hydrosulfate, nitrate salt, phosphate, halogen compound and acetate is supported in an electrically conductive base plate.

(11) A method for the production of a nickel electrode for alkaline secondary battery of any one of above described (1) to (5), wherein a particle that mainly consists of the aforementioned high-order nickel hydroxide, or a complex particle with a surface layer that mainly consists of aforementioned high-order cobalt compound on the surface of the core layer particle that mainly consists of aforementioned high-order nickel hydroxide is supported in an electrically conductive base plate to form a electrode plate, and then lithium hydroxide solution is impregnated to said electrode plate.

(12) A method for the production of a nickel electrode for alkaline secondary battery of any one of above described (1) to (5), wherein a particle that mainly consists of the aforementioned high-order nickel hydroxide, or a complex particle with a surface layer that mainly consists of aforementioned high-order cobalt compound on the surface of the core layer particle that mainly consists of aforementioned high-order nickel hydroxide is supported in an electrically conductive base plate to form a electrode plate, and then solution of at least one kind of the compound of lithium carbonate, hydrosulfate, nitrate salt, phosphate, halogen compound and acetate is impregnated to the electrode plate.

(13) An alkaline secondary battery comprising a nickel electrode for alkaline secondary battery of any one of above described (1) to (5).

Additionally, lithium metal content (wt %) in the active material particle of above described (1) is the value calculated by multiplying 100 to the value obtained by the weight of lithium metal divided by the total weight of the high-order nickel hydroxide, high-order cobalt compound and lithium metal, and the value of the denominator of this fraction does not contain the weight of the binder. Also, in case the active material contains zinc, the value of the denominator contains the weight of zinc. On the other hand, the zinc metal content (wt %) in the active material particle is calculated by multiplying 100 to the value obtained by the weight of zinc metal divided by the total weight of the high-order nickel hydroxide, high-order cobalt compound, lithium metal and the zinc metal, and the value of the denominator of this fraction does not contain the weight of the binder. The weight of the rare earth element is not included in the denominator of the above-mentioned fraction as the same way as the binder. On the contrary, calcium and magnesium are included in the denominator of the above-mentioned fraction.

Effects of the Invention

According to the configuration of above described (1), a nickel electrode for alkaline secondary battery that has a large discharge capacity, low irreversible capacity, and also a high-rate discharge characteristics and excellent charge/discharge cycle characteristic can be obtained.

According to the configurations of above described (2) and (3), a nickel electrode for alkaline secondary battery that has a large discharge capacity, especially high charge characteristics when it is charged at a high temperature, and excellent cycle characteristic can be obtained.

According to the configuration of above described (4), a nickel electrode for alkaline secondary battery that has a large discharge capacity, high charge characteristics when it is charged at a high temperature, and/or high discharge voltage can be obtained.

According to the configuration of above described (5), in addition to the above-mentioned characteristics improvement, an alkaline secondary battery with excellent nickel electrode productivity can be obtained.

According to the configuration of above described (6), an active material complex particle for nickel electrode whose nickel will not be elude out when rinsed in water can be synthesized According to the configuration of above described (7), an active material complex particle for nickel electrode of above described (6) can be synthesized efficiently According to the configuration of above described (8), (9), and (11), a nickel electrode equipping the active material complex particle for nickel electrode containing Li which will not elude out even rinsed in water can be produced effectively.

According to the configuration of above described (10), a decrease in viscosity of the active material paste in time can be inhibited, and then the amount of filling variation of the active material can be reduced.

According to the configuration of above described (12), by Li salt solution impregnation instead of LiOH solution impregnation, the electrode plate can be inhibited to absorb the moisture or the carbon dioxide gas in the air even it is left in the air after drying compared to the one that are impregnated with LiOH solution.

According to the configuration of above described (13), an alkaline secondary battery that has a larger discharge capacity, higher charge efficiency, better high-rate discharge characteristics, and a better charge/discharge cycle characteristic can be obtained compared to the conventional alkaline secondary battery which has a nickel electrode in positive electrode plate

BEST MODE FOR CARRYING OUT THE INVENTION

Figure 1:
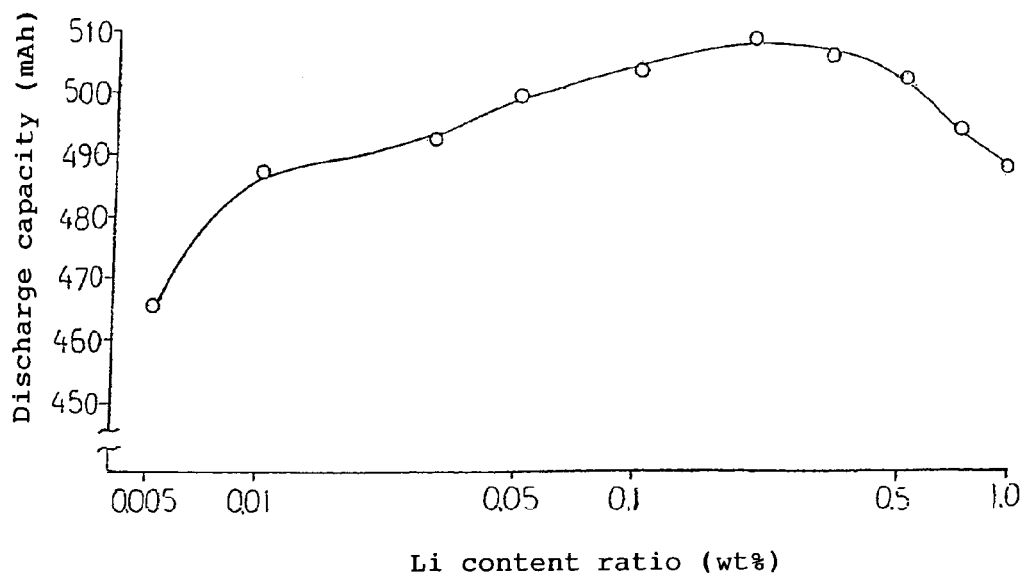
FIG. 1 is a graph to show the relation (Table 1) between the discharge capacity of evaluation cell for nickel electrode charged in the ambient temperature of 20° C., and the lithium content ratio in the active material particle of the nickel electrode.

In the present invention, the high-order nickel hydroxide whose oxidation number of Ni is higher than +2 is a compound obtained by oxidation of nickel hydroxide with oxidant or by electrolytic oxidation in alkaline electrolyte. As the oxidation number of Ni, it is a value which changes when the battery is charged or discharged, however, the oxidation number of Ni meant here is the value in the process of solid solution of the Li in the active material particle at the nickel electrode before incorporating the nickel electrode into the battery. In the present invention it is better to make the aforementioned oxidation number of Ni higher than +2 and +2.4 or less, preferably in a range from +2.02 to 2.4, and more preferably in a range from 2.05 to 2.2. Especially, it is preferable the oxidation number of Ni is 2.18 or less. When the oxidation number of Ni is +2.0 or less, it is difficult to solid solve Li in the nickel hydroxide, and also there is a tendency to increase the discharge reserve capacity. When the oxidation number of Ni is higher than 2.4, battery capacity becomes negative electrode limitation, and discharge capacity tends to decrease. Such deterioration of the negative electrode characteristics can hardly be observed when the oxidation number of Ni is 2.18 or less. Thus, by making the oxidation number of Ni 2.18 or less, bigger discharge capacity battery can be obtained as there will be almost no the deterioration of the negative electrode characteristics due to the decreased discharge reserve In the present invention, the active material particle for the nickel electrode mainly consists of the aforementioned high-order nickel hydroxide and preferably contains a small amount of Zn or Co as the solid solution state in the aforementioned nickel hydroxide. Adding Zn has an effect to inhibit the generation of inactive γ-NiOOH, and adding Co has an effect to guide the electrical charge potential to the direction of the base, resulting in improved electrical charging efficiency. The content ratio of Zn in the high-order nickel hydroxide is preferably from 1 to 6 wt %. When the ratio is smaller than 1 wt %, the effect of the added Zn will not be sufficient, and when it is higher than 6 wt %, there is a tendency to decrease the active material capacity (mAh/g). Also, when the ratio is lower than 0.1 wt %, the effect of added Co will not be sufficient, and when it is higher than 5 wt %, there is a tendency to decrease active material capacity (mAh/g).

In the present invention, the aforementioned active material particle for nickel electrode is preferably a complex particle consisting of a core layer consisting of the aforementioned high-order nickel hydroxide and a surface layer made of high-order cobalt compound. The high-order cobalt compound has an oxidation number of Co around +3, a good electric conductivity, and also effect improving the current collecting function. The percentage of the high-order cobalt compound in the aforementioned surface layer in the active material particle at the nickel electrode is preferably 3 to 10 wt %. When the ratio is less than 3 wt %, the surface layer formation effect will possibly be small, and when the percentage is larger than 10 wt %, the capacity of the active material (mAh/g) will be possibly small.

Cobalt compound that forms the aforementioned surface layer preferably contains Li. The cobalt compound containing Li is superior in the anti reduction characteristics to the conventional high-order cobalt compound that does not contain Li, and is effective fully drawing the inherent capacity from the active material because it may keep the conductivity in stable even a deep discharging is performed. Thus, deeper discharge would be possible, and then reducing irreversible capacity are possible comparing to simply using the conventional high-order cobalt compound that does not contain Li.

Though it is difficult to actually measure the oxidation number of Ni contained in the active material particle containing Co other than Ni such as high-order nickel hydroxide particle of Co solid solution and aforementioned complex particle, as stated before, as oxidation number of Co is assumed as +3, in the present invention, the oxidation number of nickel is calculated in the following formula (Oxidation number of Ni formula).

Oxidation number of Ni=(average oxidation number of the transition metal element in the active material particle−3×Co mole fraction)/mole fraction of Ni However, the average oxidation number of the transition metal element in the active material particle is the average value of the oxidation numbers of Ni and Co contained in the active material particle, and Ni mole fraction+Co mole fraction=1.

Li contained in the active material particle, in the present invention, exists in the solid solution state as expressed in the present invention, as it will not elude out when it is rinsed with water, it is conjectured that it is neither adsorbed at the particle surface nor sustained in the open fine pores on the particle surface, it is incorporated into the crystal of the active material particle that mainly consists of the high-order nickel hydroxide. The Li content ratio in the active material for the nickel electrode mentioned in the present invention is, as stated before, the ratio of Li (converted amount as a simple) contained in the active material particle rinsed in the water until the pH of the supernatant solution becomes 11.5 or lower, by decantation method applying pure water to the active material particle in the room temperature As stated above, Li incorporated in the crystal of the active material particle is thought to have an effect to improve the stability of the $Ni(OH)_2$ crystal. That means, in case of nickel hydroxide that does not incorporate Li in the crystal, when the oxidation number of Ni is larger than +3.1, it becomes unstable and starts destruction, however, the active material particle for the nickel electrode stated in the present invention is stable till the oxidation number of Ni is +3.2 to 3.4. When the stability of $Ni(OH)_2$ crystal improves, when it is charged, for example, side reaction such as oxygen generation is inhibited and then the charge efficiency improves. Also, when the oxygen generation at the time of charging is inhibited, for example, as the corrosion of the hydrogen absorbing alloy at the negative electrode and the liquid leakage are inhibited, the cycle characteristic will be improved.

The active material for the nickel electrode mentioned in the present invention contains lithium (Li) to be a solid solution at from 0.01 to 0.5 wt % of the converted amount as a simple. Especially, when the aforementioned Li content ratio is 0.03 to 0.5 wt %, it is preferable as the discharge capacity of the nickel electrode will be large and the irreversible capacity will be smaller; and when it is 0.05 to 0.5 wt %, it is more preferable as the discharge capacity will be larger and the cycle characteristic will be better, and a range from 0.05 to 0.3 wt % is much more preferable. When the Li content ratio is less than 0.1 wt %, the Li content effect cannot be performed. Also, when the Li content ratio is higher than 0.5 wt %, there is the possibility of decreased utilization rate of the active material due to the low discharge voltage. Also, there will be a tendency of over-charge, and possibly because due to the over-charge, the generation of inactive γ-NiOOH will be facilitated, and the generated oxygen amount will be increased by electrolyte degradation, facilitating the corrosion of the hydrogen absorbing alloy, the capacity rapidly decreases when the charge/discharge cycle is repeated.

Additionally, the effect is unique to Li, and other alkaline metals such as Na and K do not have such effect. It is thought that the reason why Na and K do not have such an effect Li has is due to the fact that they are difficult to be incorporated into the nickel hydroxide crystal because of their larger ion radii. Also, this is not to restrict the method to incorporate Li into the active material for the nickel electrode, the followings can be applied.

Furthermore, as the nickel electrode for alkaline secondary battery stated in the present invention, it is preferable to contain compound of rare earth element that contains at least one kind of element selected from element group (also referred as "heavy rare earth element") from Ho, Er, Tm, Yb and Lu, other than positive electrode active material particle. The compound of heavy rare earth elements added to the nickel electrode has an effect to increase the overvoltage of oxygen generation reaction (oxygen overvoltage) at the nickel electrode, expand the difference of the electric charging potential and oxygen regenerating electric potential at the nickel electrode, and inhibit the electrolysis reaction of the electrolyte by charging when the battery is charged under the atmospheric temperature up to a high temperature (60° C.). Because of this, cycle characteristic can be significantly improved by using a nickel electrode containing heavy rare earth element compound especially in an alkaline secondary battery with a limited amount of electrolyte.

To contain the aforementioned heavy rare earth element compound in the nickel electrode, it can be obtained by adding and mixing the widely available oxide particle of heavy rare earth element, hydroxide particle, halide particle, and the following altered heavy rare earth compound particle to the active material particle at the positive electrode. Among these heavy rare earth element compounds, oxide and halide are unstable in the alkaline electrolyte, and they transform to hydroxide in the presence of the alkaline electrolyte. On the contrary, hydroxide of heavy rare earth element and altered heavy rare earth compound exists stably in the alkaline electrolyte. Therefore, the nickel electrode for alkaline secondary battery stated in the present invention is conjectured to contain hydroxide of heavy rare earth element and altered heavy rare earth compound other than the positive electrode active material particle, and the hydroxide of heavy rare earth element and altered heavy rare earth compound increase the oxygen overvoltage of the aforementioned nickel electrode.

Among the aforementioned compound of heavy rare earth element, oxides and hydroxides increase the oxygen overvoltage of the nickel electrode, however, when these compounds are co-existed with alkaline solution, oxides turn into hydroxides. Also, hydroxides have a possibility to transform to hydrates. In these transformations, oxides and hydroxides react with water molecule that consists of electrolyte. Therefore, in the battery with nickel electrode incorporated nickel electrode containing these compounds, water is possibly consumed. On the other hand, a compound of the aforementioned heavy rare earth element having unique X-ray diffraction peak using Kα line of Co to be d=0.88 nm, d=0.84 nm and d=0.76 nm (hereinafter referred as "altered heavy rare earth compound") has the effect to increase the oxygen overvoltage of the nickel electrode as same as the aforementioned nickel electrode that contains hydroxide, and does not react with alkaline electrolyte, thus, the water in the electrolyte will not be consumed even when co-existed with the electrolyte. Therefore, addition of the altered heavy rare earth element to the nickel electrode is effective to improve the performance of alkaline secondary battery with limited liquid amount The aforementioned altered heavy rare earth element compound can be obtained by adding and dispersing the powder of either of the oxide or the hydroxide of the aforementioned heavy rare earth element into the solution of either KOH or NaOH at the temperature from 60 to 80° C. with the density of 30 wt % for 3 days. The improvement of the oxygen overvoltage of the nickel electrode can be obtained by adding and mixing the powder to the active material particle at the positive electrode, after synthesizing the powder. Also, by adding and mixing the powder of the oxide of aforementioned heavy rare earth element with the active material powder of the nickel electrode, and dispersing the powder mixture as stated above in the solution of either of KOH or NaOH at the temperature from 60 to 80° C. with density of 30 wt % for 3 days, the aforementioned oxide of heavy rare earth element once gets solved in the alkali, deposited as hydroxide on the surface of the active material powder, and then transforms to the aforementioned altered compound of heavy rare earth compound. Also, as in the process that the oxide of the heavy rare earth element once solved into the alkaline solution deposits as hydroxide on the surface of the active material powder, the deposited hydroxide of the heavy rare earth element is mixed evenly with the active material powder, it is preferable as it can obtain a significant effect even when the content ratio of the heavy rare earth compound is small.

Additionally, as the alkaline secondary battery of the present invention, the content ratio of the oxide of the aforementioned heavy rare earth element or the compound of altered heavy rare earth element for the nickel electrode (compound weight of the heavy rare earth element/(active material weight at the positive electrode+compound weight of the heavy rare earth element)×100 (wt %)) is not necessarily specified, however, it is preferable that the ratio of the hydroxide or oxide of the heavy rare earth element in the total of the active material particle and hydroxide or oxide of the heavy rare earth element to be 0.5 to 3 wt % in weight ratio. If the ratio is less than 0.5 wt %, a sufficient effect of adding hydroxide or oxide of the heavy rare earth element cannot be obtained, and if it is higher than 3 wt %, the capacity of the nickel electrode will be decreased, and also, it may result in a decrease of high discharge characteristics due to the decreased current collecting function.

It is preferable that the active material particle mentioned at the positive electrode in the present invention contains at least one kind element selected from magnesium (Mg) and calcium (Ca) ranging from 0.1 to 3 wt % as the solid solution state. When cobalt (Co) is contained in the active material particle at the positive electrode as solid solution state, the discharging electric potential at the nickel electrode will be decreased, however, by adding Mg as solid solution state, the descent of the discharging potential at the nickel electrode will be inhibited. Also, by adding Ca as the state of solid solution to the particle that mainly consists of nickel hydroxide, an electrolysis reaction can be inhibited during the charge under the atmospheric temperature up to the high temperature (of 40° C.), and the charge efficiency can be improved without using expensive heavy rare earth element.

The nicked electrode in the present invention is a nickel electrode of the aforementioned active material particle for the nickel electrode supported in the electrically conductive base plate. The base plate for the nickel electrode in the present invention is not necessarily specified. For example, steel plate of nickel or nickel plating are preferable, and two dimensional material such as punching steel plate as well as three dimensional material such as foam, fiber group organizer, and emboss-treated material can be used. The thickness is not necessarily specified, however, a range from 5 to 700 μm is used. The base plate is preferably a nickel which is superior in corrosion resistance against alkali or nickel-plated steel plate. The shape of the basic plate is preferably metal foam that has a three dimensional madreporic body which is superior in current collection and active material retention function.

A nickel electrode with specified thickness can be obtained by adding and kneading a thickening agent solution to the active material particle that mainly consists of high-order nickel hydroxide whose oxidation number is higher than +2 (or it can be replaced with complex particle with a surface layer that mainly consists of high-order cobalt compound on the surface), and making it paste, coating the paste on the base plate and drying, and then pressing it.

The aforementioned thickening agent is not particularly specified, and conventionally used carboxymethyl cellulose (CMC) or methyl cellulose (MC) can be used. However, in the present invention, when making the paste, a high-order compound obtained from a pre-oxidation treatment of active material particle is preferably used. In this case, for example, while using aforementioned carboxymethyl cellulose (CMC) or methyl cellulose (MC) as thickening agents, possibly because CMC and MC get oxidative decomposed, the viscosity of the paste rapidly decreases over time, and there is a possibility that supporting the paste to the electrically conductive base plate will be difficult. To avoid these shortcomings of CMC and MC, it is preferable to use natural polysaccharides (xanthan gum) made of glucose, mannose, glucuronic acid, and natural polysaccharides (Whelan gum) made of glucose, rhamnose, and glucuronic acid. These natural polysaccharides are superior to CM an CMC in oxidation resistance, when paste is made mixed with active material particle oxidation treated, the thickening agent monocule will not be decomposed, and there is a benefit that the viscosity of the paste can be stably retained for a long time.

The particle that mainly consists of the aforementioned nickel hydroxide in the present invention should be more preferably high-order nickel compound such as nickel oxyhydroxide and a high-order cobalt compound such as cobalt oxyhydroxide by oxidizing a cobalt compound that forms the aforementioned surface layer, a part of nickel hydroxide that forms the core layer, and a cobalt solid solution before incorporated in the battery. Nickel hydroxide and cobalt hydroxide can be transformed to a high-order compound by oxidation treatment of the particle that mainly consists of nickel hydroxide using oxidant agent such as hypochlorate, in the presence of, for example, sodium hydroxide and potassium hydroxide solution. An inhabitation of the discharge reserve generation of alkaline secondary battery can be performed by such an oxidation treatment.

Below is the detail of the present invention as a nickel hydroxide secondary battery as an actual example, however, the present invention is not limited to the following; and it can be applied to the alkaline secondary battery other than nickel cadmium battery and the like which apply nickel electrode to the positive electrode, and the testing method, active material that consists of the positive electrode of the battery, material for the negative electrode, the positive electrode, the negative electrode, electrolyte, separator, and the shape of the battery, and the like can be optional.

The First Embodiment (a)

The first Embodiment stated here is the process before the production of the nickel electrode which is the method to impregnate Li to the active material powder of the nickel electrode that mainly consists of high-order nickel hydroxide with pre-oxidation (See above (6) and (7)). In this method, an oxidation of the active material particle for the nickel electrode that forms a cobalt hydroxide layer on the surface of the core layer particle that mainly consists of $Ni(OH)_2$ using oxidant in alkaline solution, or production of the complex particle with high-order cobalt compound on the surface whose core layer is high-order nickel hydroxide oxidized by electrolysis can be performed. However, as an oxidation of the particle by electrolysis needs special electrolysis equipment, and the process tends to be complicated, an oxidation method using oxidant is preferable (oxidation treatment). Li is impregnated to the complex particle by contacting the obtained complex particle to the LiOH solution (Li impregnating treatment).

In the method, the method to control the Li content ratio in complex particle is not particularly limited. For example, active material with a certain lithium content ratio is obtained by maintaining a constant treatment condition such as the temperature of the reaction bath (treatment solution) for Li impregnation treatment, LiOH concentration of the treatment solution, duration of treatment time. However, specifying the amount of the active material for reacting, $Li^+$ concentration in the treatment solution, and the amount of the treatment solution, and full reaction ("full" means saturating the Li concentration in the active material) will improve the accuracy of the Li ratio in the active material, and therefore will be preferable.

Other than LiOH, NaOH or KOH can co-exist in the Li impregnation treatment solution. In case of oxidation treatment using oxidant, the alkaline concentration in the oxidation treatment liquid should be 20 wt % or less, and the oxidation treatment temperature is preferably 60° C. or less. When the alkaline concentration in the oxidation treatment solution is higher than 20 wt % or the treatment temperature is higher than 60° C., the density of the active material particle tends to decrease. In case performing the electrolysis, for example, it can be operated by filling the particle in a electrically conducive container, making a hydrogen absorbing alloy electrode which is already chemically converted as a counter electrode, composing a cell for the electrode with electrolysis of KOH solution ranging from 6 to 8 mol/l, electrolyzing it so that the oxidation number of Ni and Co in the particle be a certain value on average at the rate of 0.02 to 0.05 ltA.

Additionally, immersing the oxidation treated complex particle in alkaline solution such as NaOH or KOH with the alkaline concentration of 30 wt % or higher and the temperature of 80° C. or higher, or mixing the complex particle and the alkaline solution, and moistening the complex particle with alkaline solution and heating to the temperature higher than 80° C. is preferable as the powder resistance (electric resistance) of the active material particle will be reduced (heat treatment).

As mentioned before, active material particle for a nickel electrode which incorporates Li in the crystal can also be obtained by heat-treating of the active material particle that mainly consists of high-order nickel hydroxide with oxidation number higher than +2 (it may have a surface layer that mainly consists of high-order cobalt compound) in the condition of contacting with the solution that contains lithium hydroxide. The applied concentration of the lithium hydroxide contained in the solution is not limited, but preferably in a range from 0.1 to 3 mol/l. When the concentration is less than 0.1 mol/l (Li impregnation treatment), the reaction time would be long, and when the concentration is higher than 3 mol/l, the solution viscosity would be high, and it would be the deficit that the active material particle is difficult to get wet. As the heat treatment, it can be treated in a short period of time when the temperature is preferably 30° C. or higher, more preferably 50° C. Also, the treatment temperature is preferably 80° C. or lower, more preferably 60° C. or lower, as the reduction of the density of the active material particle can be prevented in the heat treatment.

The following is the explanation of the synthesizing method of active material particle for the positive electrode with different content weight of Li in the first embodiment of the actual example, and the characteristics of the nickel hydrogen battery that uses a positive electrode, but the relation of the Li amount in the positive electrode and the battery characteristics is common with the following embodiment, not limited to the first embodiment.

Example 1

Synthesis of Nickel Hydroxide Particle

An amine complex was produced by adding ammonium sulfate and potassium hydroxide solution into the solution of nickel sulfate, zinc sulfate and cobalt sulfate whose metal hydroxide mass ratio is described below. Furthermore, potassium hydroxide solution was dropped during the reaction system was vigorously stirred with controlling the reaction bath temperature at 45±2° C., pH at 12±0.2, and then sphere type high density particle (hereinafter referred simply as "nickel hydroxide particle") that mainly consists of nickel hydroxide (which contains 2.5 wt % of Zn. Also, after the formation of the surface layer, heat treatment, and the Li impregnating process into the active material particle, the value of the content ratio of the zinc metal in the active material is 2.4 wt %) whose average particle diameter is 10 μm and the metal equivalent mass ratio is Ni:Zn:Co=91:4:5 was obtained.

(Formation of the Surface Layer, Heat Treatment Process)

100 g of the aforementioned sphere shape high density nickel hydroxide particle was added to the 400 ml of alkaline solution controlled with pH 12±0.2 using NaOH. A solution with specified concentration of cobalt sulfate and ammonium was dropped during the agitation of the above-mentioned solution. During this time, NaOH solution was dropped properly and the temperature of the reaction bath was maintained in the range of 45±2° C. and the pH 12±0.2. The solution was kept with the temperature of 45±2° C., and the pH at 12±0.2 for about one hour, and a surface layer that consists of complex hydroxides containing Co on the surface of the nickel hydroxide particle. 12 g of NaOH solution with 18 mol/l was added to the obtained particle and mixed, and kept at 120° C. for one hour. After the filtration of the sodium hydroxide solution, it was rinsed in water and dried. The ratio of the obtained surface layer of the complex hydroxide particle was 7 wt % against the core layer mother particles (hereinafter referred simply as "core layer").

(Oxidation Treatment of the Active Material Particle and Measurement of the Average Oxidation Number of Ni and Co Contained in the Active Material Particle)

100 g of the above-mentioned particle after forming the surface layer was added into 400 g of NaOH solution of 4.5 mol/l and dispersed, and the dispersed solution was heated to 50° C. 30 ml of sodium hypochlorite was added during the agitation of the dispersed solution, and kept the agitation for 3 hours. The temperature of the solution was kept at 50° C. Particles were filtered from the dispersed solution, rinsed in water and dried. The average oxidation number of the transition metal elements (Ni, Co) contained in the active material particle after the oxidation treatment was measured using a publicly known method (the method of reacting the active material particle with ammonium ferrous sulfate, then performing redox titrimetry). The result shows that the average oxidation number of the transitional metal element (Ni, Co) is +2.15.

(Li Impregnation Process to the Active Material Particle)

10 g of the complex particle after the aforementioned oxidation treatment was dispersed into 400 g of the mixture solution of NaOH and LiOH that contains 4.5 mol/l of NaOH and 1.2 mol/l of LiOH, stirred for 3 hours, and the dispersed solution was maintained at the temperature of 50° C. during that time. After the reaction finished, aforementioned solution was filtered. The obtained particles were dispersed in 400 ml of pure water at the room temperature (25° C.), and rinsed it in water using the gradient technique (decantation). After rinsing in water repeatedly until the pH of its supernatant solution got 11 and after drying, the active material particle for nickel electrode was obtained.

(Quantitative Determination of Li Contained in Active Material Particle)

By atomic absorption analysis, Li amount contained in the aforementioned active material particle for the nickel electrode was determined. The lithium amount (equivalent as simple body) contained in the active material obtained in the present invention was 0.2 wt %.

(Production of Nickel Electrode)

Active material paste was obtained by mixing the obtained active material particle, 0.6 wt % xisantan gum solution, and dispersion liquid of polytetra-fluoroethylene powder with 40 wt % solid portion ratio whose carrier fluid is water at the rate of 76.7:22.9:0.4. A master plate of a nickel electrode with the thickness of 0.8 mm was obtained by filling the active material paste in the nickel foam with the thickness of 1.4 mm, the area density of 450 g/m2, and spreading by a roller after drying. The nickel electrode was obtained by cutting the master plate in the specified size (30 mm×30 mm) with the capacity calculated using the filled amount of the active material particle (the filled amount of active material (g)×nickel hydroxide in the active material (including high-order nickel compound) ratio (wt %)×289 mAH/g) to be 460 mAh.

(Production of Electrode of Hydrogen Absorbing Alloy)

SBR (styrene butadiene rubber) dispersed solution as an adhering agent and methylcellulose (MC) solution as a thickening agent were added and kneaded to the powder of hydrogen absorbing alloy that has the compound of Mm $Ni_{4.0}Co_{0.7}Al_{0.3}Mn_{0.3}$ (Mm stands for mish metal) with the average particle diameter of 30 μm, and made it paste, and the paste was put on the nickel-posted base plate with hole steel characteristics, dried and rolled to make basic plate of the hydrogen absorbing alloy electrode, cut the basic plate in the specified size (35 mm×35 mm) and made electrode of hydrogen absorbing alloy. Also, the filled capacity of the electrode of the hydrogen absorbing alloy (filled amount of the electrode powder of hydrogen absorbing alloy×amount per unit weight of the powder of hydrogen absorbing alloy) was 730 mAh.

(Production and Test of the Cell for the Nickel Electrode Evaluation)

A cell was assembled with the electrode of the aforementioned hydrogen absorbing alloy as a negative electrode, and the nickel electrode as a positive electrode which is prepared separately from the nickel electrode to be used for this evaluation, and synthesized in the specified method. We allocated the electrode of hydrogen absorbing alloy that was already synthesized via separator was allocated on the both sides of the aforementioned nickel electrode, and poured the specified amount of alkaline electrolyte containing 7 mol/l of KOH, and open-type cells was produced.

10 pieces of the aforementioned cell for nickel electrode evaluation were prepared, out of which, 5 pieces of them were charged in the atmospheric temperature of 20° C., and the other 5 pieces at the ambient temperature of 60° C. The batteries charged at the ambient temperature of 60° C. were moved to the ambient air temperature of 20° C. right after finishing the charging. After keeping left both batteries charged at 20° C. and 60° C. for 3 hours of charging, those were discharged in the ambient temperature of 20° C. The charging was performed at the positive electrode at the rate of 0.2 ltA (92 mA) for 7.5 hours. The discharging was performed at the rate of 0.2 ltA (92 mA), and cut off when the electric potential at the positive electrode became 0V against the reference electrode (Hg/HgO electrode) electric potential.

The ratio of the gained discharge capacity (mAh) after charging at 60° C. of the charge/discharge test to the discharge capacity (mAh) after charging at 20° C. was calculated, and the calculated value was set as the charging efficiency (%) of charging at 60° C.

(Production and Synthesizing of Cylindrical Type Nickel Hydroxide Secondary Battery)

The original plate of the aforementioned nickel electrode and the original plate of the hydrogen absorbing alloy electrode were cut as the specified size, and an electrode plate group was composed by layering the cut plates via separator of hydrophilia-treated, bonded-fiber fabric of polypropylene of 100 μm, and wrapping the layered body. The electrode plate group were inserted into the metal battery case that is also the negative electrode, the specified amount of alkaline electrolyte that contains 6.8 mol/l of KOH and 0.8 mol/l of LiOH were poured, and then the opening end of the metal battery case was sealed air-tightly using a cap that is also the positive electrode, and a cylindrical type, sealed secondary battery of nickel hydroxide was obtained. The filling capacity of the positive electrode of the secondary battery (nickel electrode) was 200 mAh, and the filling capacity of the negative electrode (hydrogen absorbing alloy electrode) was 3200 mAh. After leaving the produced battery over night, it was charged for 30 hours at ⅓₀ ltA in the ambient temperature of 20° C., and then charged for 6 hours at 0.11 ltA continuously. After that, it was discharged at the cutoff voltage of 1.0V. Continuously, it was charged for 15 hours at 0.11 ltA, and then discharged at the cutoff voltage of 1.0V. The charge/discharge cycle was set as one cycle, and the charge/discharge cycle was repeated four times from the second cycle to the fifth cycle, and then it was synthesized.

(Charge/Discharge Test of the Cylindrical Type, Nickel Hydroxide Secondary Battery)

10 batteries after activation attached with a pressure sensor for the measurement of battery inner pressure were prepared, and 5 pieces of them were charged in the ambient temperature of 20° C. and the other 5 pieces of them were charged in the ambient temperature of 60° C. Those were charged with a rate of 0.5 ltA (1000 mA) for 3 hours. Battery inner pressures were recorded at the end of the charging. The batteries charged at the ambient temperature of 60° C. were moved to the ambient air temperature of 20° C. right after finishing the charging. After keeping left both batteries charged at 20° C. and 60° C. for 3 hours of charging, those were discharged at the rate of 0.2 ltA (400 mA) and the discharge cutoff voltage of 1.0V in the ambient temperature of 20° C. The ratio of the gained discharge capacity (mAh) after charging at 60° C. to the discharge capacity (mAh) after charging at 20° C. was calculated, and the calculated value was set as the charging efficiency (%) of charging at 60° C.

(Charge/Discharge Cycle Test of Cylindrical Type Nickel Hydride Battery)

5 secondary batteries after activation were prepared for the charge/discharge cycle test in the ambient temperature of 20° C. Those were charged at the rate of 1 ltA (200 mAh) for 66 minutes, and left for one hour after the termination of charge, and then discharged to 1.0V at rate of 1 ltA with the discharge cutoff voltage at 1.0V. The charge/discharge cycle was set as one cycle, and the charge/discharge cycle was terminated at the point where the discharge capacity reached to 80% of the discharge capacity obtained at the first cycle, and the cycle number was determined as the cycle life.

Example 2

In Example 1, after the oxidizing treatment, the concentration of LiOH in the complex solution of NaOH and LiOH used in the process of impregnation of lithium into the obtained complex particle was 0.1 mol/l. Other than that, the configuration was the same as Example 1. The ratio of Li in the active material particle was 0.01 wt %. This example is called as Example 2.

Example 3

In Example 1, after the oxidizing treatment, the concentration of LiOH in the complex solution of NaOH and LiOH used in the process of impregnation of lithium into the obtained complex particle was 0.2 mol/l. Other than that, the configuration was the same as Example 1. The ratio of Li in the active material particle was 0.03 wt %. This example is called as Example 3.

Example 4

In Example 1, after the oxidizing treatment, the concentration of LiOH in the complex solution of NaOH and LiOH used in the process of impregnation of lithium into the obtained complex particle was 0.4 mol/l. Other than that, the configuration was the same as Example 1. The ratio of Li in the active material particle was 0.05 wt %. This example is called as Example 4.

Example 5

In Example 1, after the oxidizing treatment, the concentration of LiOH in the complex solution of NaOH and LiOH used in the process of impregnation of lithium into the obtained complex particle was 0.8 mol/l. Other than that, the configuration was the same as Example 1. The ratio of Li in the active material particle was 0.1 wt %. This example is called as Example 5.

Example 6

In Example 1, after the oxidizing treatment, the concentration of LiOH in the complex solution of NaOH and LiOH used in the process of impregnation of lithium into the obtained complex particle was 1.5 mol/l. Other than that, the configuration was the same as Example 1. The ratio of Li in the active material particle was 0.3 wt %. This example is called as Example 6.

Example 7

In Example 1, after the oxidizing treatment, the concentration of LiOH in the complex solution of NaOH and LiOH used in the lithium impregnation process into the obtained complex particle was 2 mol/l. Other than that, the configuration was the same as Example 1. The ratio of Li in the active material particle was 0.5 wt %. This example is called as Example 7.

Comparative Example 1

In the Example 1, the lithium impregnation process was not performed. The ratio of Li in the active material particle was 0.0 wt %. Other than that, the configuration was the same as Example 1. This example is called as Comparative Example 1.

Comparative Example 2

In the Example 1, after the heat treatment process, 100 g of nickel hydroxide particle was dispersed into the 400 g of the complex solution of NaOH and LiOH with 4.5 mol/l of NaOH and 1.2 mol/l of LiOH, stirred for 3 hours, and the temperature of the dispersed solution was maintained at 50° C. After the reaction terminated, the aforementioned mixture solution was filtered. The obtained particle was dispersed in 400 ml of pure water and rinsed it in water using the gradient technique (decantation) repeatedly until the pH of its supernatant solution got 11, Also, the lithium impregnation process after the oxidation treatment process was omitted. Other than that, the configuration was the same as Example 1. The ratio of Li in the active material particle was 0.005 wt %. This example is called as Comparative Example 2

Comparative Example 3

In the Example 1, after the oxidizing treatment, the concentration of LiOH in the complex solution of NaOH and LiOH used in the lithium impregnation process into the complex particle was 2.4 mol/l. Other than that, the configuration was the same as Example 1. The ratio of Li in the active material particle was 0.7 wt %. This example is called as Comparative Example 3.

Comparative Example 4

In the Example 1, after the oxidizing treatment, the concentration of LiOH in the complex solution of NaOH and LiOH used in the lithium impregnation process into the obtained complex particle was 3 mol/l. Other than that, the configuration was the same as Example 1. The ratio of Li in the active material particle was 1.0 wt %. This example is called as Comparative Example 4.

Figure 2:
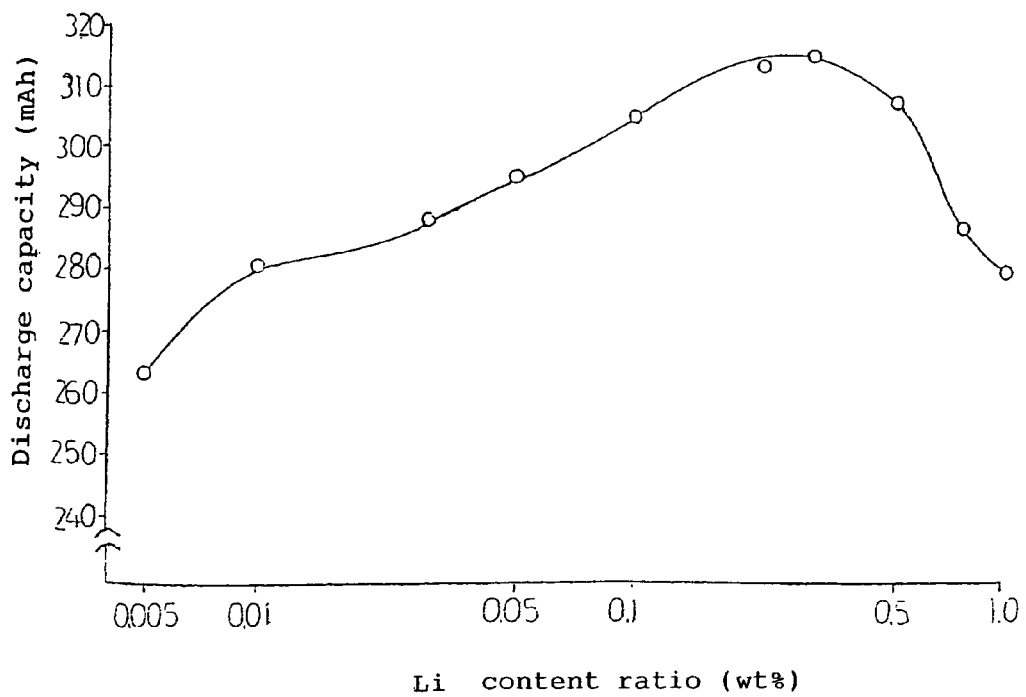
FIG. 2 is a graph to show the relation (Table 1) between the discharge capacity of evaluation cell for nickel electrode charged in the ambient temperature of 60° C., and the lithium content ratio in the active material particle of the nickel electrode.

Table 1 shows the results of test of Li content ratio in the active material particle for nickel electrode and the cell for nickel electrode evaluation obtained in Examples 1 to 7 and Comparative Examples 1 to 4. Also, FIG. 1 shows the relation between the discharge capacity obtained after charging at the ambient temperature of 20° C. and the Li content ratio, and FIG. 2 shows the relation between the discharge capacity obtained after charging at the ambient air temperature of 60° C. and the Li content ratio.

TABLE 1

| Classification | Li content ratio (wt %) | Discharge capacity | | Charge efficiency at 60° C. (%) |
|---|---|---|---|---|
| | | At 20° C. (mAh) | At 60° C. (mAh) | |
| Example 1 | 0.2 | 509 | 312 | 61.4 |
| Example 2 | 0.01 | 488 | 282 | 57.6 |
| Example 3 | 0.03 | 493 | 287 | 58.3 |
| Example 4 | 0.05 | 498 | 294 | 59.0 |
| Example 5 | 0.10 | 502 | 302 | 60.2 |
| Example 6 | 0.3 | 507 | 314 | 62.0 |
| Example 7 | 0.5 | 504 | 306 | 60.8 |
| Comp. Example 1 | 0.0 | 454 | 250 | 55.0 |
| Comp. Example 2 | 0.005 | 466 | 263 | 56.5 |

TABLE 1-continued

| Classification | Li content ratio (wt %) | Discharge capacity At 20° C. (mAh) | Discharge capacity At 60° C. (mAh) | Charge efficiency at 60° C. (%) |
|---|---|---|---|---|
| Comp. Example 3 | 0.7 | 496 | 285 | 57.5 |
| Comp. Example 4 | 1.0 | 490 | 276 | 56.4 |

As shown in Table 1, Examples of the present invention show higher charge efficiency than Comparative Examples, and the capacities are 1.13 to 1.2 times larger than the capacity 460 mAh calculated from the weight of the active material particle (calculated as 289 mAh per 1 g of active material). In Examples, it is considered that high discharge capacity was obtained because Li inserted in the crystal of the active material of the nickel electrode stabilized the crystal of the active material, and then the acceptance charge capacity of the nickel electrode was increased when the oxidation number of Ni increased caused by charging. Example 1 which did not add Li shows a capacity close to the calculated value, and the Comparative Example 2 has a smaller range of increase of the capacity compared to the Comparative Example 1. In the case of Example 2, it is considered that as the Li content ratio in the active material of the nickel electrode was small, a significant effect was not obtained by adding Li. Also, Example 3 and Example 4 whose Li content ratio in the active material of the nickel electrode are large, keep high capacities compared to the Comparative Example 1 and Example 2, however, the discharge capacity is slightly smaller compared to Examples 4 to 7 whose Li content ratio are 0.05 to 0.5 wt %. It is considered that this is due to the fact that as the discharge voltage of the nickel electrode is low, the utilization rate of the active material was slightly decreased. Also, it is considered that the charge efficiency are lower in Comparative Example 1 and Comparative Example 2 when charged at 60° C. compared to the Examples is because that the inactive γ-NiOOH was produced by the charging. In Comparative Example 3 and Comparative Example 4, charge efficiency of the charging at 60° C. is higher compared to Comparative Example 1 and Comparative Example 2, however, the charge efficiency is lower compared to the Examples. In Comparative Example 3 and Comparative Example 4, it is considered that as the Li content ratio is excessively high, and it has a tendency to get over-charged when it is charged in a usual manner, this over-charge produces inactive γ-NiOOH, lowering the charge efficiency.

As shown in FIG. 1, when charged in the ambient temperature at 20° C., a high discharge capacity was obtained in a range from 0.01 to 0.5 wt % of Li ratio in the active material of the nickel electrode; it was confirmed that a high discharge capacity can be obtained especially in a range from 0.05 to 0.5 wt % especially in arrange from 0.1-0.5. Also, as shown in FIG. 2, when charged in the ambient temperature at 60° C., a high discharge capacity was obtained in a range from 0.01 to 0.5 wt % of Li ratio in the active material of the nickel electrode; it was confirmed that a high discharge capacity can be obtained especially in a range from 0.1 to 0.5 wt %. In the viewpoint of the discharge capacity, it was found that Li content ratio in the active material of the nickel electrode in better in a range from 0.01 to 0.5 wt %, preferably from 0.05 to 0.5 wt %, and more preferably from 0.1 to 0.5 wt %. Additionally, considering the cycle life, as shown in Table 2 and FIG. 5, the Li content ratio in the active material of the nickel electrode is most preferably from 0.05 to 0.3 wt %.

Figure 3:
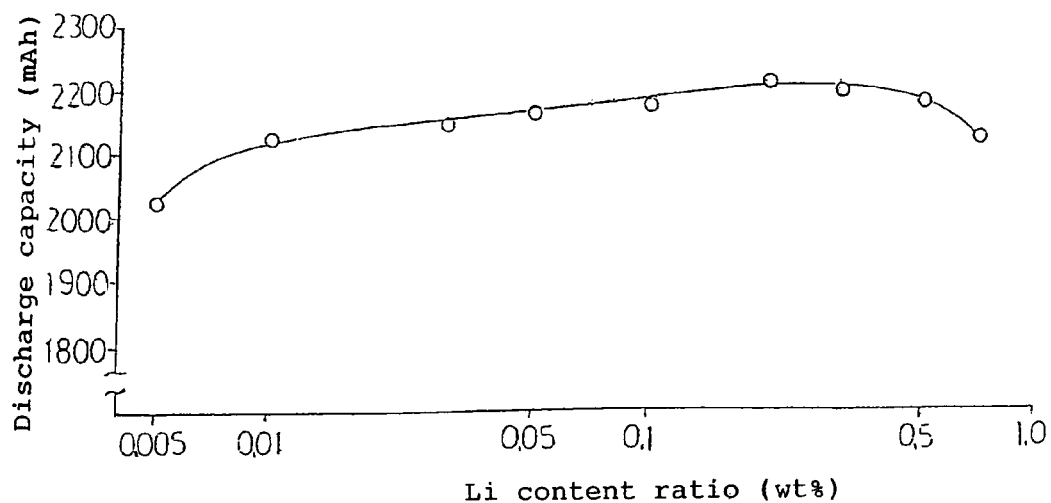
FIG. 3 is a graph to show the relation (Table 2) between the discharge capacity of cylindrical type nickel-hydride secondary battery charged in the ambient temperature of 20° C., and the lithium content ratio in the active material particle of the nickel electrode
Figure 4:
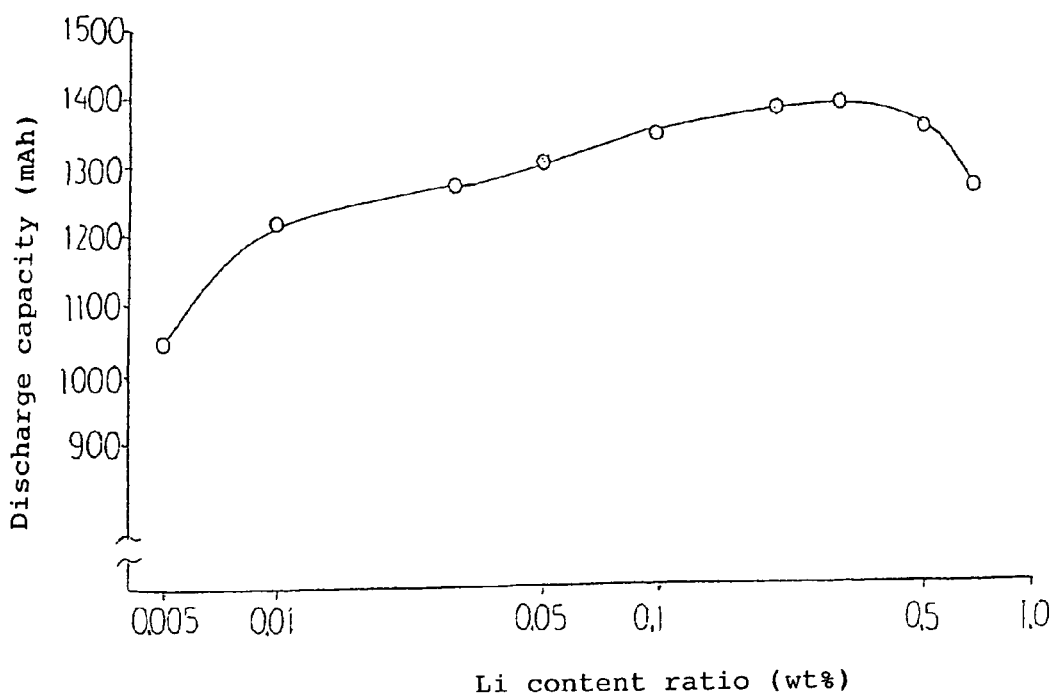
FIG. 4 is a graph to show the relation (Table 2) between the discharge capacity of cylindrical type nickel-hydride secondary battery charged in the ambient temperature of 60° C., and the lithium content ratio in the active material particle of the nickel electrode.
Figure 5:
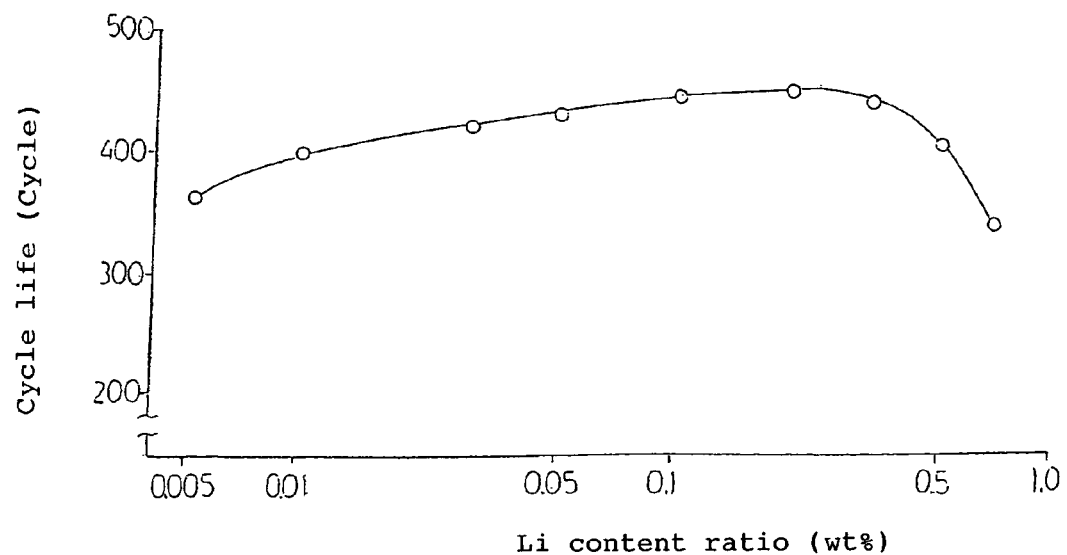
FIG. 5 is a graph to show the relation (Table 2) between the charge/discharge cycle life of cylindrical type nickel-hydride secondary battery and the lithium content ratio in the active material particle of the nickel electrode.

Table 2 shows the test results of the cylindrical type nickel hydride battery performed in Examples 1 to 7 and Comparative Example 2 and Comparative Example 3. Also, FIG. 3 shows the relation between the obtained discharge capacity after charging in the ambient temperature of 20° C. and the Li content ratio; FIG. 4 shows the relation between the obtained discharge capacity after charging in the ambient temperature of 60° C. and the Li content ratio; and FIG. 5 shows the relation between the charge/discharge cycle life and the Li content ratio in the active material particle of the nickel electrode.

TABLE 2

| Classification | Li content ratio (wt %) | Inner pressure At 20° C. (MPa) | Inner pressure At 60° C. (MPa) | Discharge capacity At 20° C. (mAh) | Discharge capacity At 60° C. (mAh) | Charge efficiency 60° C. (%) | Cycle life (cycle) |
|---|---|---|---|---|---|---|---|
| Example 1 | 0.2 | 0.5 | 0.8 | 2212 | 1354 | 61.4 | 420 |
| Example 2 | 0.01 | 0.7 | 1.0 | 2127 | 1223 | 57.5 | 398 |
| Example 3 | 0.03 | 0.7 | 1.0 | 2140 | 1247 | 58.3 | 404 |
| Example 4 | 0.05 | 0.7 | 1.0 | 2160 | 1270 | 58.8 | 406 |
| Example 5 | 0.10 | 0.5 | 0.8 | 2180 | 1310 | 60.1 | 418 |
| Example 6 | 0.3 | 0.5 | 0.8 | 2204 | 1364 | 61.9 | 416 |
| Example 7 | 0.5 | 0.6 | 0.8 | 2190 | 1327 | 60.6 | 401 |
| Comp. ex. 2 | 0.005 | 1.0 | 1.4 | 2020 | 1137 | 56.3 | 367 |
| Comp. ex. 3 | 0.7 | 0.8 | 1.1 | 2148 | 1230 | 57.3 | 352 |

As shown in Table 2, the discharge capacity of the cylindrical type nickel hydride secondary battery reflects the discharge capacity of the applied nickel electrode; Examples shows higher discharge capacities than Comparative Examples both at 20° C. and 60° C. Also, as shown in FIG. 3 and FIG. 4, it was found that the nickel hydride secondary battery which was applied nickel electrode which Li content ratio was 0.01 to 0.5 wt % in the active material particle of the nickel electrode, showed high capacity. Especially, nickel hydride secondary battery which was applied to nickel electrode with Li content ratio from 0.05 to 0.5 wt % showed high capacity, and when charged at 60° C., as shown in FIG. 4, nickel hydride secondary battery which was applied to nickel electrode with Li content ratio from 0.1 to 0.5 wt % showed extremely high capacity. Also, the inner pressure increase in the Examples is inhibited at the time of charging compared to the Comparative Examples. It is, as shown in Table 1, considered that when applying the nickel electrode related to the Examples, a high charge capacity can be obtained, and as oxygen gas produced from the positive electrode is little, the increase of the inner pressure of the battery at the time of charging was inhibited.

Additionally, as shown in Table 2, it was found that Examples showed better cycle performances compared to Comparative Examples. While the reason is unclear, it is considered that in the cases of Examples, while the stability of the crystal of the active material particle of the nickel electrode increased by inserting Li into the active material of the nickel electrode, and the capacity decrease of the nickel electrode was inhibited during the charge/discharge process was repeated, in the cases of Comparative Example 1 and Comparative Example 2, as the crystal structure of the active material of the nickel electrode was changed when charge/discharge process was repeated, and then the inactive γ-NiOOH was produced, compared to the Examples, and the discharge capacity of the nickel electrodes was rapidly decreased. Also, in the cases of Comparative Example 3 and Comparative Example 4, it is considered that at the high-rate discharge such as 1 ltA in this charge/discharge cycle test, the discharge capacity per one cycle is small as the discharge voltage is low, and as over-charge is more likely to occur than in usual manner of charging, the battery gets over-charged every time it is charged, γ-NiOOH may be facilitated to be produced, and the oxygen amount generated according to the resolving of the electrolysis at the time of charging, then the corrosion of the hydrogen absorbing alloy got facilitated, and the decrease of the discharge capacity was facilitated.

In addition, though the details description is omitted here, as the Li impregnation process to the active material particle of the nickel electrode, as shown in Examples 1 to 7 of the aforementioned first Embodiment, instead of filtering the particle and the treating liquid after immersing the specified amount (100 g in the aforementioned Examples) of the active material particle that is oxidized with aforementioned process and heat-treated into the specified amount (400 g in the Example) of the complex solution of NaOH and LiOH at the 50° C. for the specified duration of time (3 hours in the Example), wetting the active material particle by LiOH solution with adding the specified amount of LiOH solution of the specified concentration to the active material particle, keeping kneading it while maintaining the temperature from 60 to 80° C. and after evaporating the water, rinsing the obtained particle in water in the same manner in Examples 1 to 7 of the aforementioned Embodiment 1, Li impregnation treatment can be performed. This method is preferable as the most of the added Li is incorporated inside the active material particles, then Li does not get wasted, and also Li concentration in the active material can be controlled precisely. The added Li solution amount is preferably set so that the mixture should be in paste with easy kneading.

For example, if 40 g of LiOH solution of 2 wt % is added to 100 g of active material and knead, the active material particle with Li density of 0.2 wt % can be obtained as same as the Example 1; if 40 g of LiOH solution of 0.1 wt % is added to 10 g of active material and knead, the active material particle with Li density of 0.01 wt % can be obtained as same as the Example 2; if 40 g of LiOH solution of 0.5 wt % is added to 100 g of active material and knead, the active material particle with Li density of 0.05 wt % can be obtained as same as the Example 4; if 40 g of LiOH solution of 1 wt % is added to 10 g of active material and knead, the active material particle with Li density of 0.1 wt % can be obtained as same as the Example 5; if 40 g of LiOH solution of 5 wt % is added to 100 g of active material and knead, the active material particle with Li density of 0.5 wt % can be obtained as same as the Example 7.

Example 8

Synthesis of a Core Layer Particle that Mainly Consists of Nickel Hydroxide 2 mol of nickel sulfate, 0.12 mol of zinc sulfate, and 0.05 mol of cobalt sulfate were solved into 2 L of water, and 1.5 mol of ammonium sulfate was added to the solution, then amine complex of nickel, zinc and cobalt were synthesized. While agitating the reaction system vigorously, further, solution of potassium hydroxide was dropped, and the temperature of the reaction bath was controlled at 45±2° C., pH at 12±0.2, and then a sphere shape, high density core layer particle was obtained, which has the average particle diameter of 10 μm that mainly consists of nickel hydroxide whose metal converted mass ratio is Ni:Zn:Co=91.5:6:2.5 (3.8 wt % of Zn is contained. Also, zinc metal content amount in the active material particles is 3.6 wt % after the formation of the surface layer, to be described later, oxidation treatment and heat treatment of the complex hydroxide particle, and Li impregnation treatment into the complex hydroxide particle).
(Formation of the Surface Layer)

10 g of the aforementioned core layer particle was added to the 400 ml of alkaline solution that is adjusted to pH 12±0.2. While agitating the solution, 100 ml of solution containing 1 mol/l of cobalt sulfate and 1 mol/l of ammonium sulfate was dropped with a small amount. During this time, maintaining the temperature of the reaction bath in the range of 45±2° C. and pH as 12±0.2, NaOH solution was dropped as needed. After about one hour, maintaining the temperature of the reaction bath in the range of 45±2° C. and pH as 12±0.2, a surface layer that consists of mixture solution containing Co on the surface of the core layer particle that mainly consists of nickel hydroxide was formed. The obtained particle was dropped into 400 ml of the NaOH solution with the concentration of NaOH as 18 mol/l and the temperature of 120° C., and then stirred while maintaining the temperature for one hour. Then, the solution was filtered and rinsed in water and dried. The surface layer ratio of the obtained complex hydroxide particle was 5 wt % to the core layer particle.
(Oxidation and Heat Treatment of the Complex Hydroxide Particle)

100 g of the particle after the surface layer formation was dispersed in 400 g of the NaOH solution with the concentration of NaOH as 4.5 mol/l, and heated so that the temperature of the dispersed solution would be 50° C. While agitating the dispersed solution, 30 ml of sodium hypochlorite solution was added, and kept agitating for 3 hours. During that time, the temperature of the solution was maintained at 50° C., and then complex hydroxide particle was obtained (oxidation treatment).

12 g of NaOH solution that contains 18 mol/l of NaOH wad added to the obtained complex hydroxide particle, and kept at 120° C. for one hour. Then, filtered the NaOH solution was filtered and rinsed in water and dried (heat treatment).
(Measurement of the Average Oxidation Number of Ni and Co of the Complex Hydroxide Particle)

The average oxidation number of the transition metal element (Ni and Co) contains in the active material particle after the impregnation treatment was measured by the publicly known method (performing redox titrimetry using potassium permanganate after reacting active material particle with ammonium ferrous sulfate). As the result, the average oxidation number of the transition metal elements (Ni, Co) was +2.15. The value was put in the aforementioned formula for the oxidation number, and the oxidation number of Ni was calculated as 2.10

(Li Impregnation Treatment into the Complex Oxide Particle and the Quantitative Determination of the Li Content Weight)

100 g of the complex oxide particle of the aforementioned oxidation treatment was soaked in 400 g of the mixture solution of NaOH and LiOH that contains 4.5 mol/l of NaOH and 0.8 mol/l of LiOH for 3 hours. The temperature of the solution was maintained at 50° C., and also the solution was stirred slowly. the obtained particle was put in the centrifugal precipitator and the solution left on the surface of the particle was removed, and then the obtained complex oxide particle was dispersed in 400 ml of pure water at the room temperature (25° C.), and rinsed it in water using the gradient technique (decantation). The rinsing in water was repeated until the pH of the supernatant solution got 11, and then dried. The complex oxide particle was measured by atomic absorption analysis for the quantitative determination of Li weight in the complex oxide particle; the Li weight was 0.1 wt %.

(Production of the Nickel Electrode Master Plate)

The obtained active material particle was mixed with 6 wt % of xanthan gum solution and 60 wt % solid ratio of polytetrafluoroethylene powder whose dispersion medium is water at the weight ration of 76.7:22.9:0.4, and the active material paste was obtained. The active material paste was filled in the foam nickel base substrate with the area density of 450 g/m$^2$, and the thickness of 1.4 mm, after drying, putting in a roller, and then 0.8 mm of a master plate of nickel electrode was obtained.

(Production of Hydrogen Absorbing Electrode Master Plate)

SBR (styrene butadiene rubber) dispersed solution as an adhering agent and methylcellulose (MC) solution as a thickening agent were added and kneaded to the powder of hydrogen absorbing alloy that has the compound of Mm $Ni_{4.0}Co_{0.7}Al_{0.3}Mn_{0.3}$ (Mm stands for mish metal) with the average particle diameter of 30 μm, and made it paste, and the paste was put on the nickel-posted base plate with hole steel characteristics, after drying, putting in a roller, and then the hydrogen absorbing alloy electrode master late was obtained.

(Production and Test of the Cell for the Nickel Electrode Evaluation)

The aforementioned master plate of the hydrogen absorbing electrodes was cut in the specified size (30 mm×30 mm) and the positive electrode of the nickel electrode cell for evaluation was obtained. The filling capacity of the positive electrode (filling weight of the active material particle (g)× ratio (wt %) of the nickel hydroxide in the active material particle (including high-order nickel compound)×289 mAh/g) was 460 mAh. The master plate of the hydrogen absorbing electrode was cut in the specified size (35 mm×35 mm) and the negative electrode of the nickel electrode cell for evaluation was obtained. The filling capacity of the negative electrode (filling capacity of hydrogen absorbing alloy particle× amount per unit weight of the hydrogen absorbing alloy powder) was 730 mAh. One sheet of the aforementioned positive electrode was put in the middle, and the already treated negative electrodes via a separator were put on the both sides, the specified amount of alkaline electrolysis that contains 7 mol/l of KOH was poured, and open-typed cell was produced. The cell was synthesized in the specified method.

(Evaluation of Irreversible Capacity)

20 cells for the evaluation of the aforementioned nickel electrode were prepared, and charged in the ambient temperature of 20° C. for the first charge. The charge was operated at the rate of 0.21 ltA (92 mA) to the positive electrode for 7.5 hours.

The remained 10 pieces after the termination of the first charge were left for one hour, and then discharged in the ambient temperature of 20° C. The discharge was performed at the rate of 0.21 ltA (92 mA) and cut off when the voltage at the positive electrode showed 0V against the reference electrode (Hg/HgO electrode). After the discharge, 10 batteries were disassembled and calculated the oxidation number of Ni contained in the active material particle in the nickel electrode. Then the irreversible capacity was calculated using the following formula (formula of irreversible capacity calculation).

Irreversible capacity(mAh/g)=(oxidation number of Ni at the termination of the first discharge−2.0)× mol number of Ni in the active material×26.8× 10$^3$/active material mass amount (Production and Synthesis of Cylindrical Type Hydride Battery)

The aforementioned master plate for nickel electrode and the master plate for the hydrogen absorbing alloy electrode were cut, layered via a hydrophilia-treated separator that consists of polypropylene bonded textile with the thickness of 100 μm, wrapped the layered body and the electrode plate group was composed. The electrode plate group was inserted into the metal made battery case as a negative electrode, after pouring 3.7 ml of alkaline electrolyte that contains 6.8 mol/l of KOH and 0.8 mol/l of LiOH, the opening ends of the metal battery case was sealed air-tightly using a cap that is also the positive terminal, and then a sealed nickel hydride battery that is limited in amount of electrolyte was obtained. The filling capacity of the positive electrode (nickel electrode) was 200 mAH and the filling capacity of the negative electrode (hydrogen absorbing electrode) was 3200 mAh. After leaving the produced batteries for one day, those were charged at the ambient temperature of 20° C. at 1/30 ltA for 30 hours, and continuously charged at 0.1 ltA for 6 hours. After that, those were discharged at 0.2 ltA and the cut-off voltage at 1.0V. The charge/discharge cycle was set as one cycle, 4 times of the charge/discharge cycle was repeated from the second to fifth cycles to synthesized them.

(Charge/Discharge Test of Cylindrical Type Nickel Hydride Battery)

10 batteries that were already synthesized were prepared, and charged at the ambient temperature of 20° C. The batteries were charged with the charging rate of 0.2 ltA (400 mA) and for 6 hours. Leaving them for one hour after the termination of charging, those were discharged at 0.2 ltA (400 mA) with the cut-off voltage at 1.0V. The average discharge voltage (V) in the charge/discharge, and the discharge capacity (mAh) were measured. The ratio (%) of the obtained charge capacity in the discharge against the positive electrode filling capacity (2000 mAh) was calculated, and then set as the index for evaluation of the characteristics of the battery in test.

(High-Rate Discharge Test of Cylindrical Type Nickel Hydride Battery)

10 batteries that were already synthesized were prepared, and charged at the ambient temperature of 20° C. The batteries were charged with the charging rate of 0.2 ltA (400 mA) and for 6 hours. After the termination of charging, the batteries were moved to a constant-temperature bath of 10° C., and left for 5 hours, and then discharged at 1 ltA with the cut-off voltage at 1.0V. The test result was set as the index for evaluation of the high-rate discharge characteristics of the battery in test.

(Charge/Discharge Cycle Test of Cylindrical Type Nickel Hydride Battery)

5 secondary batteries that were synthesized were prepared for the charge/discharge cycle test in the ambient temperature of 20° C. Those were charged at the rate of 1 ltA (2000 mAh) for 66 minutes, and left for one hour after the termination of charge, and then discharged at the discharge rate of 1 ltA with the discharge cutoff voltage at 1.0V. The charge/discharge cycle was set as one cycle, and the charge/discharge cycle was terminated at the point where the discharge capacity reached to 80% of the discharge capacity obtained at the first cycle, and the cycle number was determined as the cycle life.

Example 9

In the Example 8, the LiOH concentration of the treatment solution (mixture solution of NaOH and LiOH) in the Li impregnation process to the complex oxide particle was set as 0.1 mol/l. Other than that was the same as Example 8. The ratio of Li in the obtained complex oxide particle was 0.01 wt %. This example is called as Example 9.

Example 10

In the Example 8, the LiOH concentration of the treatment solution (mixture solution of NaOH and LiOH) in the Li impregnation process to the complex oxide particle was set as 0.2 mol/l. Other than that was the same as Example 8. The ratio of Li in the obtained complex oxide particle was 0.03 wt %. This example is called as Example 10.

Example 11

In the Example 8, the LiOH concentration of the treatment solution (mixture solution of NaOH and LiOH) in the Li impregnation process to the complex oxide particle was set as 0.4 mol/l. Other than that was the same as Example 8. The ratio of Li in the obtained complex oxide particle was 0.05 wt %. This example is called as Example 11.

Example 12

In the Example 8, the LiOH concentration of the treatment solution (mixture solution of NaOH and LiOH) in the Li impregnation process to the complex oxide particle was set as 1.5 mol/l. Other than that was the same as Example 8. The ratio of Li in the obtained complex oxide particle was 0.3 wt %. This example is called as Example 12.

Example 13

In the Example 8, the LiOH concentration of the treatment solution (mixture solution of NaOH and LiOH) in the Li impregnation process to the complex oxide particle was set as 2.0 mol/l. Other than that was the same as Example 8. The ratio of Li in the obtained complex oxide particle was 0.5 wt %. This example is called as Example 13.

Comparative Example 5

In the Example 8, the process of soaking the complex oxide particle into the LiOH solution was omitted. The ratio of Li in the complex oxide particle was 0.0 wt %. This example is called as Comparative Example 5.

Comparative Example 6

In the Example 8, 100 g of the complex oxide particle before oxidation treatment was soaked in the mixture solution of NaOH and LiOH that contains 4.5 mol/l of NaOH and 0.8 mol/l of LiOH for 3 hours. During this time, the temperature of the solution was maintained at 50° C., and also the solution was stirred slowly. The obtained particle was put in the centrifugal precipitator and removed the solution left on the surface of the particle, and then the complex oxide particle was dispersed in 400 ml of pure water and rinsed in water using the gradient technique (decantation). The rinsing in water was repeated until the pH of the supernatant solution got to 11, and then dried. The Li impregnation treatment after the oxidation treatment was omitted. The ratio of Li in the complex oxide particle was 0.005 wt %. This example is called as Comparative Example 6.

Comparative Example 7

In the Example 8, the LiOH concentration of the treatment solution in the process of soaking treatment of the complex oxide particle to the solution of NaOH and LiOH was set as 2.4 mol/l. Other than that was the same as Example 8. The ratio of Li in the obtained complex oxide particle was 0.7 wt %. This example is called as Comparative Example 7.

Comparative Example 8

In the Example 8, the LiOH concentration of the treatment solution in the process of soaking treatment of the complex oxide particle to the solution of NaOH and LiOH was set as 3.0 mol/l. Other than that was the same as Example 8. The ratio of Li in the obtained complex oxide particle was 1.0 wt %. This example is called as Comparative Example 8.

Figure 6:
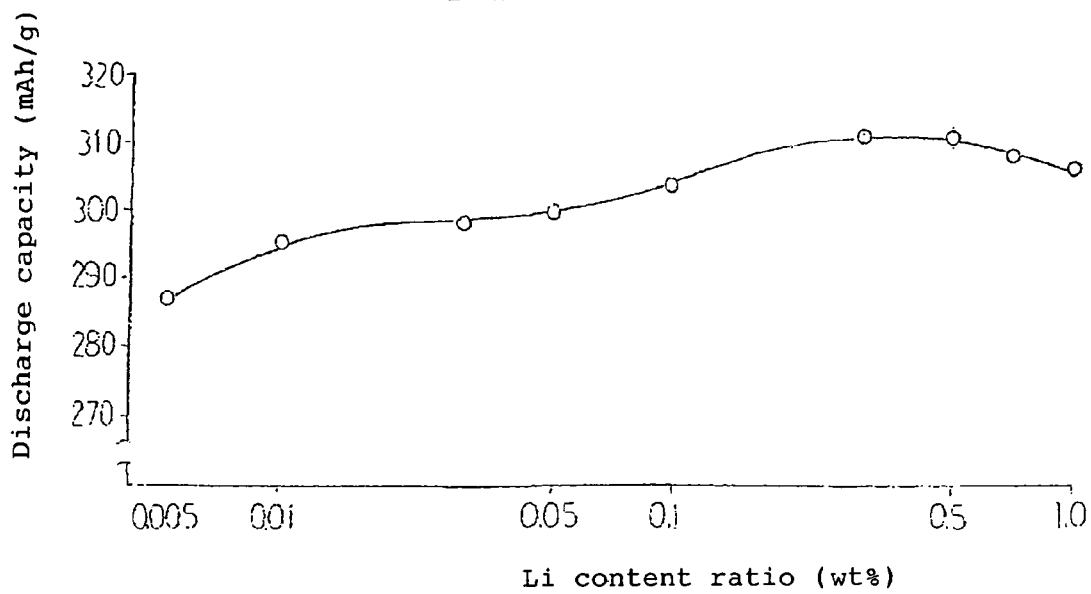
FIG. 6 is a graph to show the relation (Table 3) between the discharge capacity of evaluation cell for nickel electrode and the lithium content ratio in the active material particle of the nickel electrode
Figure 7:
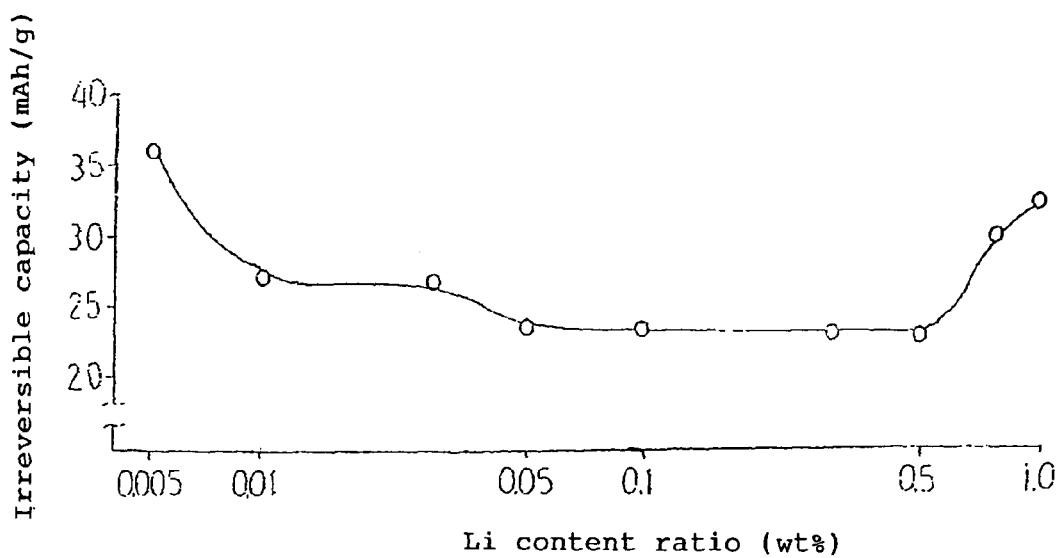
FIG. 7 is a graph to show the relation (Table 3) between the irreversible capacity of evaluation cell for nickel electrode and the lithium content ratio in the active material particle of the nickel electrode

Table 3 shows the Li content ratio of the active material particle for nickel electrode and cell test results (the average of 10 pieces) for the evaluation of the nickel electrode obtained in Examples 8 to 13 and Comparative Examples 5 to 8. Also, FIG. 6 shows the relation between discharge capacity and the Li content ratio shown in Table 3, and FIG. 7 shows the relation between irreversible capacity and Li content ratio.

TABLE 3

| Classification | Li content ratio (wt %) | oxidation no. of Ni after $1^{st}$ charge | Discharge capacity (mAh/g) | Irreversible capacity (mAh) |
|---|---|---|---|---|
| Example 8 | 0.10 | 2.08 | 303 | 23 |
| Example 9 | 0.010 | 2.09 | 295 | 27 |
| Example 10 | 0.03 | 2.09 | 298 | 27 |
| Example 11 | 0.05 | 2.08 | 300 | 23 |
| Example 12 | 0.30 | 2.08 | 309 | 23 |
| Example 13 | 0.50 | 2.08 | 309 | 23 |
| Comp. Example 5 | 0.00 | 2.12 | 284 | 36 |
| Comp. Example 6 | 0.005 | 2.12 | 288 | 36 |
| Comp. Example 7 | 0.70 | 2.10 | 304 | 29 |
| Comp. Example 8 | 1.0 | 2.11 | 301 | 32 |

As shown in Table 3, the examples of the present invention show larger discharge capacities than Comparative Example 5 which uses the active material that does not contain Li, and the capacities are 1.02 to 1.08 times as large as of the capacity of 460 mAh (286 mAh/g) which is calculated from the active material filled amount; and also, the irreversible capacity is small. It is thought that the reason why such a high discharge capacity was obtained is because Li that is inserted into the active material crystal of the nickel electrode stabilizes the crystal of the active material whose oxidation number of Ni is increased by charging, and then the charge acceptance capacity is increased. Comparative Example 5 shows a capacity slightly lower than the calculated value, and also Comparative Example 6 shows a smaller increase capacity difference compared to Comparative example 5. It is thought that in Comparative Example 6, as the Li content ratio in the active material of the nickel electrode is small, a significant effect cannot obtained by adding Li. Also, in Comparative Example 5 and Comparative Example 6, the irreversible capacity is larger than the Examples possibly because the produced amount of γ-NiOOH is large, in Comparative Examples 7 and Comparative Example 8, high capacity can be obtained, however, the irreversible capacity is large possibly because the discharge voltage is low and the discharge capacity ratio against the charge acceptance capacity is small.

As shown in FIG. 6, when it is charged in the ambient temperature at 20° C., high discharge capacity was obtained when the range of Li ratio of nickel electrode active material is 0.01 wt % or higher, especially at 0.05% a high capacity, and 0.1% or higher special high discharge capacity was confirmed to be obtained. Also, as shown in FIG. 7, when the Li content ratio is in the range from 0.01 to 0.5 wt %, the irreversible capacity was small, especially in the range from 0.05 to 0.5 wt %, the irreversible capacity was confirmed to be especially small. In the viewpoints of discharge capacity and irreversible capacity, the desirable Li content ratio in the active material of the nickel electrode is confirmed to be 0.01 to 0.5 wt %, preferably to be 0.05 to 0.5 wt %, and more preferably to be 0.1 to 0.5 wt %. Additionally, considering the cycle life, as shown in Table 4 and FIG. 8, the Li content ratio in the active material of the nickel electrode is most preferably 0.05 to 0.3 wt %.

Figure 8:
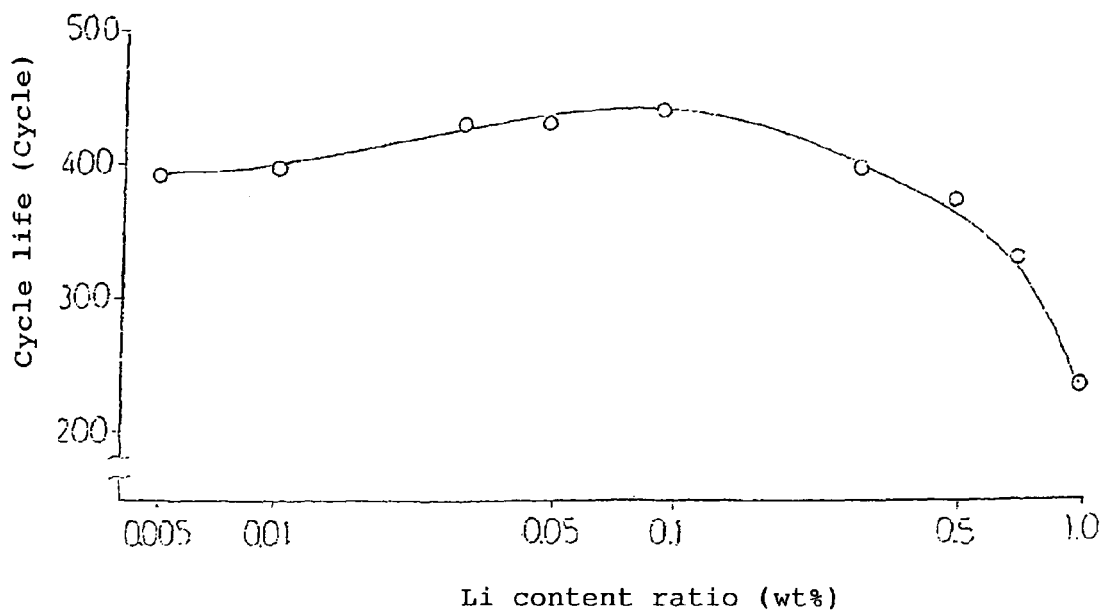
FIG. 8 is a graph to show the relation (Table 4) between the cycle life of a cylindrical type nickel hydride battery and the lithium content ratio in the active material particle of the nickel electrode.

Table 4 shows the test results of the cylindrical type nickel hydride battery in Examples 8 to 13 and Comparative Examples 5 to 8. FIG. 8 shows the cycle test result.

TABLE 4

| Classification | Li content ratio (wt %) | 0.2ltA discharge capacity (mAh) | 0.2ltA discharge capacity (%) | 1ltA disch. Cap. (mAh) | Cycle life (cycle) |
| --- | --- | --- | --- | --- | --- |
| Example 8 | 0.10 | 2084 | 104.2 | 1771 | 423 |
| Example 9 | 0.010 | 2030 | 101.5 | 1786 | 398 |
| Example 10 | 0.03 | 2063 | 103.0 | 1772 | 415 |
| Example 11 | 0.05 | 2071 | 104.5 | 1800 | 416 |
| Example 12 | 0.3 | 2102 | 105.1 | 1744 | 396 |
| Example 13 | 0.5 | 2110 | 105.5 | 1723 | 371 |
| Comp. Example 5 | 0.00 | 1986 | 99.3 | 1787 | 402 |
| Comp. Example 6 | 0.005 | 1993 | 99.5 | 1771 | 393 |
| Comp. Example 7 | 0.7 | 2085 | 104.3 | 1293 | 335 |
| Comp. Example 8 | 1.0 | 2077 | 103.9 | 1180 | 219 |

As shown in Table 4, the discharge capacity of cylindrical type nickel hydride battery at 0.2 ltA is reflecting the discharge capacity of the applied nickel electrode, and the Examples 8 to 13, Comparative Example 6 and Comparative Example 8 showed a higher discharge capacity compared to Comparative Example 5 and Comparative Example 6. However, in Comparative Example 6 and Comparative Example 8, the discharge capacity was large at 20° C. and 0.21 ltA is large, but small at 10° C. and 1 ltA, and also as shown in FIG. 8, the cycle life was confirmed to be inferior. In Comparative Example 7 and Comparative Example 8, possibly because the proton expansion is slow in the active material particle due to the high Li content ratio in the active material, when the high-rate discharge (1 ltA discharge) was performed, the discharge voltage was lower and discharge endurance time is short compared to Examples 8 to 13, Comparative Example 5, and Comparative Example 6 (discharge capacity was small). Also in the charge/discharge cycle test performed at the ambient temperature of 20° C., the same tendency was confirmed as in the discharge at 10° C. and 1 ltA. In the charge/discharge cycle test, as the charge capacity is fixed {Charge rate (charge current) and charge duration are fixed}, Comparative Example 7 and Comparative Example 8 having smaller charge capacity show the larger degree of over-charge per cycle compared to Examples 8 to 13, Comparative Example 5 and Comparative Example 6, it is thought that the discharge capacity was rapidly decreased because inactive γ-NiOOH was produced by the over-charge.

The First Embodiment (b)

Aforementioned (2) and (3) Rare Earth Element Compound Content

Example 14

Production of Nickel Electrode, Cell for Evaluation of Nickel Electrode, and Cylindrical Type Nickel Hydride Secondary Battery In Example 1, in the process of producing the nickel electrode, instead of active material as single body particle for the nickel electrode, the mixed particle of 98 parts by weight of active material particle for nickel electrode and 2 parts by weight of erbium hydroxide {Er(OH)$_3$} were applied. Other than that, the configuration was the same as Example 1. The filling capacity of the nickel electrode applied for the cell for evaluation of the nickel electrode was 450 mAh; the filling capacity of the nickel electrode applied for the cell for evaluation of the cylindrical type nickel hydride secondary battery electrode was 1960 mAh. This example is called as Example 14.

(Test of Cell for Evaluation of the Nickel Electrode)

A charge/discharged in the ambient temperature of 20° C. was performed. The battery was charged against the positive electrode at the rate of 0.2 ltA (90 mA) for 7.0 hours and left for one hour, then charged at the rate of 0.2 ltA (90 mA) and cut it off when the voltage at the positive electrode got 0V against the reference electrode (Hg/HgO electrode). The discharge capacity (mAh) obtained in this discharge test was set as the index for evaluation of the characteristics of the battery in test.

(Charge/Discharge Test of Cylindrical Type Nickel Hydride Secondary Battery)

10 secondary batteries that were already synthesized with an attached pressure sensor to measure the pressure inside the battery were prepared, and 5 pieces of them were charged at the ambient temperature of 20° C. and the rest of 5 pieces at the ambient temperature of 60° C. The charging rate was 0.2 ltA and the duration was 7.0 hours. The inside pressures of the batteries were recorded at the termination of the test. The batteries charged at the ambient temperature of 60° C. were moved to the ambient temperature of 20° C. immediately after the termination of charging. After leaving for 3 hours after the termination of charging, those were discharged in the ambient temperature of 20° C. at the rate of 0.2 ltA, and the cutoff voltage 1.0V. The discharge capacity obtained in this discharge (mAh) and the ratio of the discharge capacity (mAh) against the discharge capacity obtained in the aforementioned discharge test at the ambient temperature of 20° C. was set as the charge efficiency (%) of the charging at 60° C., and the discharge capacity (mAh) and discharge efficiency were set as indexes for evaluation of the characteristics of the battery in test.
(Charge/Discharge Cycle Test of Cylindrical Type Nickel Hydride Secondary Battery)

5 batteries that were synthesized were prepared for the charge/discharge cycle test in the ambient temperature of 20° C. Those were charged at the rate of 1 ltA (2744 mAh) for 84 minutes, and left for one hour after the termination of charge, and then discharged at the discharge rate of 1 ltA with the discharge cutoff voltage at 1.0V. The charge/discharge cycle was set as one cycle, and the charge/discharge cycle was terminated at the point where the discharge capacity reached to 80% of the discharge capacity obtained at the first cycle, and the cycle number was determined as the cycle life.

Example 15

In Example 14, in the process of producing the nickel electrode, instead of the mixed particle of 98 parts by weight of active material particle for nickel electrode and 2 parts by weight of erbium hydroxide $\{Er(OH)_3\}$, the mixed particle of 98 parts by weight of active material particle for nickel electrode and 2 parts by weight of ytterbium hydroxide $\{Yb(OH)_3\}$. Other than that, the conformation was the same as Example 14 for the cell for evaluation of the nickel electrode and the cylindrical type nickel hydride secondary battery. This example is called as Example 15.

Comparative Example 9

In Example 15, An active material particle that do not contains impregnated Li as active material of nickel electrode was used, other than that the conformation was the same as Example 15. This example is called as Comparative Example 9.

Table 5 shows the test results of the cell for evaluation of nickel electrode relevant to Example 14, Example 15, and Comparative Example 9; Table 6 shows the test results of cylindrical type nickel hydride secondary battery.

TABLE 5

| Classification | Additives | Li content ratio (wt %) | At 20° C. discharge cap. (mAh) | At 60° C. Discharge cap. (mAh) | At 60° C. Charge efficiency (%) |
|---|---|---|---|---|---|
| Example 14 | Er(OH)₃ | 0.20 | 515 | 364 | 70.7 |
| Example 15 | Yb(OH)₃ | 0.20 | 517 | 372 | 72.1 |
| Comp. ex. 9 | Yb(PH)₃ | 0.0 | 464 | 311 | 67.2 |

As shown in Table 5, the cells for evaluation of nickel electrode relevant to Example 14 and Example 15 have higher charge efficiencies compared to Example 1. Especially when charged at the ambient temperature of 60° C., the charge efficiency is greatly improved. Also, Example 14 and Example 15 show a higher charge efficiency at 60° C. compared to Comparative Example 15. In Example 14 and Example 15, it is thought, as hydroxides of rare earth elements of Er and Yb are added to the nickel electrode in addition to that nickel electrode contains Li, the charge efficiency has been raised, and the charge efficiency has been improved especially when charged at the high temperature of 60° C.

TABLE 6

| Classification | Additives | Li content ratio (wt %) | Inner pressure At 20° C. (MPa) | Inner pressure At 60° C. (MPa) | Discharge capacity At 20° C. (mAh) | Discharge capacity At 60° C. (mAh) | Charge efficiency 60° C. (%) | Cycle life (cycle) |
|---|---|---|---|---|---|---|---|---|
| Example 14 | Er(OH)₃ | 0.20 | 0.5 | 0.7 | 2236 | 1580 | 70.6 | 455 |
| Example 15 | Yb(OH)₃ | 0.20 | 0.5 | 0.7 | 2245 | 1620 | 72.2 | 470 |
| Comp. ex. 9 | Yb(PH)₃ | 0.0 | 0.8 | 1.0 | 2109 | 1413 | 67.0 | 430 |

As shown in Table 6, when the cylindrical type nickel hydride secondary battery relevant to Example 14 and Example 15 are charged at the high temperature of 60° C., the increase of the inside pressure of the battery is inhibited, and also, show a large discharge capacity. In Example 14 and Example 15, as described in the section of the cell for evaluation of the nickel electrode, it is thought that in addition to that the active material of the nickel electrode that contains Li, added Ho to Lu of rare earth elements improved the charge efficiency, and as the degradation of electrolysis was lowered, the internal pressure of the battery got inhibited, at the same time, a high capacity was achieved. It is also thought that the cycle life was improved because the impedance augmentation was inhibited due to the degradation of electrolysis, and furthermore, the corrosion of hydrogen absorbing alloy was inhibited, as well as that the stability of the crystal structure of the active material of the nickel electrode was improved, and the decrease of the discharge capacity of the nickel electrode when charge/discharge was repeated.

Example 16

Production of Nickel Electrode and Cylindrical Nickel Hydride Battery

In Example 8, in the process of producing the nickel electrode, instead of active material as single body particle for the nickel electrode, the mixed particle of 98 parts by weight of active material particle for nickel electrode and 2 parts by weight of ytterbium oxide $\{Yb_2(O)_3\}$ were applied. Other than that, the configuration was the same as Example 8, and the cylindrical nickel hydride battery that the filling capacity of the nickel electrode is 1960 mAh was obtained. This example is called as Example 16.
(Charge/Discharge Test of Cylindrical Type Nickel Hydride Battery)

10 batteries that were already synthesized were prepared, and charged at the ambient temperature of 20° C. The batteries were charged with the charging rate of 0.2 ltA (392 mA) and for 6 hours. Leaving them for one hour after the termination of charging, those were discharged at 0.2 ltA (392 mA)

with the cut-off voltage at 1.0V. The average discharge voltage (V), and the discharge capacity (mAh) were measured.
(Evaluation of Charge Efficiency)

5 batteries that were performed charge/discharge test in the ambient temperature of 20° C. were moved to in the ambient temperature of 60° C. and left for 3 hours. After the termination of the duration of the leaving, those were charged at with the same charge rate as the aforementioned ambient temperature of 20° C. After the termination of the charge, the batteries were moved to the ambient temperature of 20° C. and left for 3 hours, and then discharged in the same ambient temperature at the rate of 0.2 ltA (392 mAh), and the cutoff voltage 1.0V. The ratio (%) of the discharge capacity (mAh) in the charge/discharge against the discharge capacity (mAh) obtained in the charge/discharge test performed at the ambient temperature of 20° C. was calculated, and the value was set as the charge efficiency (%). The discharge capacity (mAh) and charge efficiency (%) were set as the indexes for evaluation of the characteristics of the battery in test.
(Charge/Discharge Cycle Test of Cylindrical Type Nickel Hydride Battery)

5 secondary batteries that were synthesized were prepared for the charge/discharge cycle test in the ambient temperature of 20° C. Those were charged at the rate of 1 ltA (1960 mAh) for 66 minutes, and left for one hour after the termination of charge, and then discharged at the discharge rate of 1 ltA with the discharge cutoff voltage at 1.0V. The charge/discharge cycle was set as one cycle, and the charge/discharge cycle was terminated at the point where the discharge capacity reached to 80% of the discharge capacity obtained at the first cycle, and the cycle number was determined as the cycle life.

Example 17

In Example 16, Yb(OH)$_3$ powder was used instead of Yb$_2$O$_3$ powder in the process of production of the nickel electrode. Other than that, the conformation was the same as Example 16, and the obtained cylindrical type nickel hydride secondary battery whose electrode filling capacity was 1960 mAh. This example is called as Example 17.

Example 18

Figure 9:
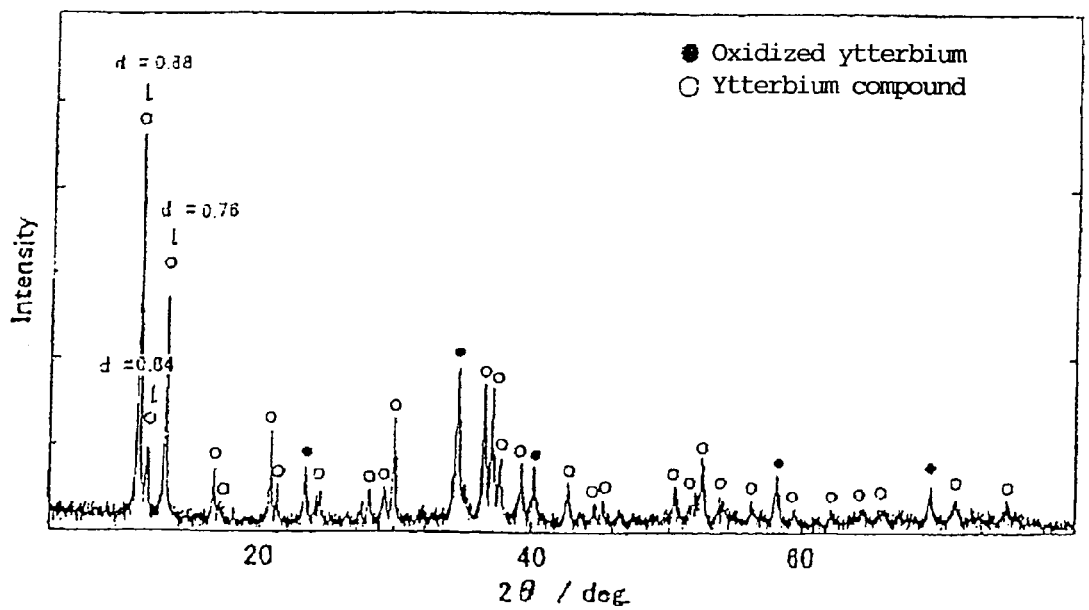
FIG. 9 is a powder X-ray diffraction diagram of oxidized ytterbium altered ytterbium contained in the nickel electrode for the alkaline secondary battery of the present invention, and oxidized ytterbium powder.

Synthesis of Altered Heavy Rare Earth Compound 50 g of ytterbium hydroxide (Yb(OH)$_3$) powder was dispersed in 200 ml of KOH solution of the concentration 30 wt % and the temperature kept at 60° C. and left for 3 days. After leaving them, the powder was filtered from the NaOH solution, and rinsed in water. The powder was used for powder X-ray diffraction measurement using CoKa ray. FIG. 9 shows the result of X-ray diffraction measurement. As shown in FIG. 9, the obtained powder shows a different diffraction pattern from Yb$_2$O$_3$ and Yb(OH)$_3$ (no diffraction patterns here), and it was confirmed to be altered heavy rare earth compound (altered ytterbium compound) which has unique diffraction peaks at d=0.88 nm, d=0.84 nm, d=0.76 nm.
(Production of Nickel Electrode and Cylindrical Type Nickel Hydride Battery)

In Example 16, altered ytterbium compound powder was used instead of Yb$_2$O$_3$ powder in the process of production of the nickel electrode. Other than that, the conformation was the same as Example 16, and the obtained cylindrical type nickel hydride secondary battery whose electrode filling capacity was 1960 mAh. This example is called as Example 18.

(Charge/Discharge Test of Cylindrical Type Nickel Hydride Battery and Charge/Discharge Cycle Test)

The charge/discharge test and charge/discharge cycle test were performed in the same procedure of Example 16.

Example 19

In Example 18, holmium hydroxide {Ho(OH)$_3$} was used instead of Yb(OH)$_3$ in the process of producing altered heavy rare earth compound. The obtained powder was confirmed to be altered heavy rare earth compound (altered holmium compound) which has unique diffraction peaks at d=0.88 nm, d=0.84 nm, d=0.76 nm. Other than that, the conformation was the same as Example 18 for both the cell for evaluation of the nickel electrode and the cylindrical type nickel hydride secondary battery. This example is called as Example 19.

Example 20

In Example 18, erbium hydroxide {Er(OH)$_3$} was used instead of Yb(OH)$_3$ in the process of producing altered heavy rare earth compound. The obtained powder was confirmed to be altered heavy rare earth compound (altered erbium compound) which has unique diffraction peaks at d=0.88 nm, d=0.84 nm, d=0.76 nm. Other than that, the conformation was the same as Example 18 for both the cell for evaluation of the nickel electrode and the cylindrical type nickel hydride secondary battery. This example is called as Example 20.

Example 21

In Example 18, thulium hydroxide {Tm(OH)$_3$} was used instead of Yb(OH)$_3$ in the process of producing altered heavy rare earth compound. The obtained powder was confirmed to be altered heavy rare earth compound (altered thulium compound) which has unique diffraction peaks at d=0.88 nm, d=0.84 nm, d=0.76 nm. Other than that, the conformation was the same as Example 18 for both the cell for evaluation of the nickel electrode and the cylindrical type nickel hydride secondary battery. This example is called as Example 21.

Example 22

In Example 18, lutetium hydroxide {Lu(OH)$_3$}was used instead of Yb(OH)$_3$ in the process of producing altered heavy rare earth compound. The obtained powder was confirmed to be altered heavy rare earth compound (altered lutetium compound) which has unique diffraction peaks at d=0.88 nm, d=0.84 nm, d=0.76 nm. Other than that, the conformation was the same as Example 18 for both the cell for evaluation of the nickel electrode and the cylindrical type nickel hydride secondary battery. This example is called as Example 22.

Table 7 shows the results of the cylindrical type nickel hydride battery relevant to Examples 16 to 22 compared to Example 8.

TABLE 7

| Classification | Added rare earth element compound | Discharge capacity (mAh) | Charge efficiency at 60° C. (%) | Cycle life (no. of cycles) |
| --- | --- | --- | --- | --- |
| Example 8 | — | 2084 | 62 | 423 |
| Example 16 | Yb$_2$O$_3$ | 2098 | 76 | 452 |
| Example 17 | Yb(OH)$_3$ | 2095 | 75 | 465 |
| Example 18 | Altered Yb Compound | 2101 | 77 | 486 |
| Example 19 | Altered Ho Compound | 2044 | 70 | 455 |

TABLE 7-continued

| Classifi-cation | Added rare earth element compound | Discharge capacity (mAh) | Charge efficiency at 60° C. (%) | Cycle life (no. of cycles) |
|---|---|---|---|---|
| Example 20 | Altered Er Compound | 2048 | 72 | 461 |
| Example 21 | Altered Tm Compound | 2083 | 75 | 467 |
| Example 22 | Altered Lu Compound | 2091 | 76 | 470 |

As shown in Table 7, cylindrical type nickel hydride secondary battery relevant to Examples 16 to 22 has higher efficiency compared to Example 8. Especially when charged in the ambient temperature of 60° C., the charge efficiency improves greatly. Also, cylindrical type nickel hydride secondary battery relevant to Examples 16 to 22 showed a superior life cycle compared to Example 8. In Examples 16 to 22, it is thought that the charge efficiency was elevated by adding heavy rare earth element compound to the nickel electrode in addition to the insert of Li into the active material of the nickel electrode, and when charged in the high ambient temperature of 60° C., the charging efficiency was significantly improved. In this way, it is thought that the superior cycle life was realized because the improved charge efficiency inhibited the side reaction of electrolyte such as electrolysis. Also, compared between Example 16, Example 17 and Example 18 to which Yb compound was added, Example 18 to which altered Yb compound was added shows an especially superior cycle characteristic. When compounds of Ho, Er, Tm or Lu other than Yb are added, it is confirmed that among these compounds, an especially superior cycle characteristic is obtained by adding altered heavy rare earth compound. This is thought that a superior cycle life was realized as the consumption of water that composes the electrolyte was inhibited by adopting a nickel electrode that contains altered heavy rare earth compound.

Also, though detail description was omitted here, when nickel electrodes added by Ho, Er, Tm or Lu oxide or hydroxide are used, it was effective in improving the charge efficiency and cycle life at 60° C. and improving the cycle life.

Also, in Examples 14 to 22, examples of adding one kind of rare earth element were described, however, in the present invention, oxide or hydroxide of rare metal element selected from Ho, Er, Tm or Lu can be used as a mixture. In case using 2 or more kinds of oxide or hydroxide as mixture, it is preferable that the total ratio of the oxide or hydroxide of the rare earth element against the active material is 0.5 to 3 wt %.

The First Embodiment (c)

Ca and/or Mg Content of Aforementioned (4)

Example 23

Synthesis of the Core Layer Particle that Mainly Consists of Nickel Hydroxide 2 mol of nickel sulfate, 0.12 mol of zinc sulfate, 0.05 mol of cobalt sulfate and 0.03 mol of magnesium sulfate were dissolved in 2l of water, and a solution that contained 1.5 mol of ammonium sulfate and 0.015 mol of lithium sulfate was added to the solution, and then an amine complex of nickel, zinc, cobalt and magnesium was generated. While agitating the reaction system vigorously, potassium hydroxide solution was dropped and maintained the reaction bath at 45±2° C. and pH 12±0.2, and then sphere type high-density particle (hereinafter referred as "nickel hydroxide particle") which mainly consists of nickel hydroxide whose average particle diameter is 10 μm, and the metal converted mass ratio of Ni:Zn:Co:Mg=90.5:6:2.5:1 (contains 3.8 wt % of Zn. However, the later-described active material particle contains 3.6 wt % of zinc metal after the formation of the surface layer, oxidation treatment and heat treatment of the complex oxidized particle, and Li impregnation into the complex oxidized particle.) was obtained (Formation of a Surface Layer)

100 g of the aforementioned sphere typed high density particle was added into 400 ml of alkaline solution whose pH was adjusted to 12±0.2. While agitating the solution, 100 ml of solution that contained 1 mol/l of cobalt sulfate and 1 mol/l of ammonium sulfate was dropped with a small amount. During this period, the temperature of the reaction bath was maintained in the ranges of 45±2° C. and pH 12±0.2. The solution was kept with the temperature of 45±2° C. and pH 12±0.2 for about one hour, and a surface layer that consisted of complex oxide that contains Co on the surface of nickel hydroxide particle was formed. The obtained particle was added into 400 ml of solution of sodium hydroxide of the temperature of 120° C. that contained 18 mol/l of sodium hydroxide, and stirred while maintaining at the temperature for one hour. Then, the solution was filtered and rinsed in water and dried. The ratio of the surface layer of the obtained complex hydroxide particle was 5 wt % against the core layer particle.

(Oxidation Treatment and Heat Treatment of the Complex Hydroxide Particles)

100 g of the particle after the surface layer formation was dispersed in 400 g of the NaOH solution with the concentration of NaOH as 4.5 mol/l, and heated so that the temperature of the dispersed solution would be 50° C. While agitating the dispersed solution, 30 ml of sodium hypochlorite solution was added, and kept agitating for 3 hours. During that time, the temperature of the solution was maintained at 50° C., and then complex hydroxide particle was obtained (oxidation treatment).

12 g of NaOH solution that contains 18 mol/l of NaOH wad added to the obtained complex hydroxide particle, and kept at 120° C. for one hour. Then, filtered the NaOH solution was filtered and rinsed in water and dried (heat treatment).

(Measurement of the Average Oxidation Number of Ni and Co of the Complex Hydroxide Particle)

The average oxidation number of the transition metal element (Ni and Co) contains in the active material particle after the impregnation treatment was measured by the publicly known method (performing redox titrimetry using potassium permanganate after reacting active material particle with ammonium ferrous sulfate). As the result, the average oxidation number of the transition metal elements (Ni, Co) was +2.17. The value was put in the aforementioned formula for the oxidation number, and the Ni oxidation number was calculated as 2.12.

(Li Impregnation Treatment into the Complex Oxide Particle and the Quantitative Determination of the Li Content Weight)

100 g of the complex oxide particle after the aforementioned oxidation treatment was soaked in the mixture solution of NaOH and LiOH that contains 4.5 mol/l of NaOH and 0.8 mol/l of LiOH for 3 hours. The temperature of the solution was maintained at 50° C., and also the solution was stirred slowly. The obtained particle was put in the centrifugal precipitator and the solution left on the surface of the particle was removed, and then the obtained complex oxide particle was dispersed in 400 ml of pure water, and rinsed it in water using the gradient technique (decantation). The rinsing in water was repeated until the pH of the supernatant solution got 11, and then dried. The complex oxide particle was measured by atomic absorption analysis for the quantitative determination of Li weight in the complex oxide particle; the Li weight was 0.1 wt %.

(Production of a Cylindrical Type Nickel Hydroxide Battery)

Aforementioned base plate for nickel electrode was cut, and the cylindrical type nickel hydride battery was the same composition as Example 8, and then the cylindrical type nickel hydride battery with nickel electrode whose filling capacity at the nickel electrode is 1980 mAh was obtained. This example is called as Example 23.

(Charge/Discharge Test of a Cylindrical Type Nickel Hydroxide Battery)

10 batteries that were already synthesized were prepared, and charged at the ambient temperature of 20° C. The batteries were charged with the charging rate of 0.2 ltA (396 mA) and for 6 hours. Leaving them for one hour after the termination of charging, those were discharged at 0.2 ltA (396 mA) with the cut-off voltage at 1.0V. The average discharge voltage (V) in the charge/discharge, and the discharge capacity (mAh) were measured.

(Evaluation of the Charge Efficiency)

5 batteries that were performed charge/discharge test in the ambient temperature of 20° C. were moved to in the ambient temperature of 40° C. and left for 3 hours. After the termination of the duration of the leaving, those were charged at with the same charge rate as the aforementioned ambient temperature of 20° C. After the termination of the charge, the batteries were moved to the ambient temperature of 20° C. and left for 3 hours, and then discharged in the same ambient temperature at the rate of 0.2 ltA (396 mAh), and the cutoff voltage 1.0V. The ratio (%) of the discharge capacity (mAh) in the charge/discharge against the discharge capacity (mAh) obtained in the charge/discharge test performed at the ambient temperature of 20° C. was calculated, and the value was set as the charge efficiency (%). The discharge capacity (mAh) and charge efficiency (%) were set as the indexes for evaluation of the characteristics of the battery in test.

Example 24

In Example 23, calcium sulfate was used instead of magnesium sulfate in the synthesizing process of nickel hydroxide. Other than that, the method was as same as Example 23, and obtained sphere type high-density particle (hereinafter referred as "nickel hydroxide particle") that mainly consists of nickel hydroxide whose metal converted mass ratio is nickel:zinc:cobalt:calcium is Ni:Zn:Co:Ca=90.5:6.5:2.5:1. This example is called as Example 24.

Example 25

In Example 23, instead of adding magnesium sulfate as single body, in the process of generating nickel hydroxide, both of magnesium sulfate and calcium sulfate were added, and a sphere type high-density particle that mainly consists of nickel hydroxide (which contains 4.1 wt % of Zn. Also, the zinc metal content ratio in the active material particle after forming the surface layer, oxidation treatment and heat treatment of the complex hydroxide compound, and the Li impregnation treatment into the complex hydroxide particle is 3.9 wt %) that is Ni:Zn:Co:Mg:Ca=89.5:6.5:2.5:1:1 was obtained. The average oxidation number of Ni and Co in the obtained particles is 2.19, and the oxidation number of Ni was calculated as 2.14. Other than that, the method was as same as Example 23. This example is called as Example 25.

Example 26

In Example 23, an active material particle for the nickel electrode that has core layer particle with Mg sustained in solid solution described in Example 23 as the positive electrode active material particle was used. Other than that, the same configuration for both of the cell for the evaluation of the nickel electrode and cylindrical type nickel-hydride secondary battery as in Example 18. This example is called as Example 26.

Table 8 shows the test results of cylindrical type nickel hydride secondary battery relevant to Examples 23 to 26 as well as Example 8.

TABLE 8

| Classification | Added elements other than Li, Zn & Co | | Added rare earth element | Average discharge voltage (V) | Discharge capacity (mAh) | 40° C. charge efficiency (%) |
| --- | --- | --- | --- | --- | --- | --- |
| | Added element | Rate wt % compound | | | | |
| Example 1 | — | — | — | 1.22 | 2084 | 96 |
| Example 23 | Mg | 1 | — | 1.24 | 2096 | 96 |
| Example 24 | Ca | 1 | — | 1.22 | 2065 | 98 |
| Example 25 | Mg + Ca | 1 + 1 | — | 1.24 | 2081 | 98 |
| Example 26 | Mg | 1 | Yb compound | 1.24 | 2077 | 98 |

As shown in Table 8, Example 23 in which Mg is sustained as solid solution in the positive electrode active material particle shows a higher average discharge voltage and discharge capacity compared to Example 8. Also, it is confirmed that Example 24 in which Ca is sustained as solid solution in the positive electrode active material particle shows a high charge efficiency when charged at the ambient temperature of 40° C. Furthermore, Example 25 in which both Mg and Ca are sustained as solid solution in the positive electrode active material particle shows a high average discharge voltage, and also a high charge efficiency when charged at the ambient temperature of 40° C.

Also, a cylindrical type nickel hydride secondary battery relevant to Example 26 has more improved charge efficiency when charged in the high temperature as the ambient temperature of 40° C. compared to Example 23 and Example 25. In Example 26, it is thought that because of adding and mixing the aforementioned heavy rare earth element (Yb) compound to the positive electrode active material particle, the charge efficiency was improved more significantly when charged in the high temperature as the ambient temperature of 40° C. Also, it is thought that the added Mg to the active material particle of the nickel electrode raised the average discharge voltage.

REFERENCE EXAMPLE 1

In addition, in order to spread active material paste on the base plate, the viscosity of active material paste is desirably at least 2000 milipascal second (mPa·s) or larger and 15000 mPa·s or smaller. In Example 8, when a carboxymethyl cellulose (CMC) that is conventionally and widely used as thickening agent was used for the production of active material paste to produce the nickel electrode, the paste viscosity was rapidly decreased while adjusting the paste, and at the point of immediately after the adjustment, the viscosity of the paste was 680 mPa·s, which is below the minimum value of the aforementioned preferred range, and difficult for coating. It is thought that possibly because the active material particle for the nickel electrode relevant to the present invention has a potent oxidizing power as it has a core layer that mainly consists of high-order nickel hydroxide and a surface layer consists of high-order cobalt compound, and also alkaline composition is impregnated while synthesizing the active material, the paste viscosity was decreased as the CMC was oxidatively decomposed by the active material particle due to the oxidizing power of the active material particle and alkaline component. On the contrary, in Example 8 in which xanthan gum was applied as thickening agent, at the point of immediately after the paste adjustment, the paste viscosity was 600 mPa·s, which meets the aforementioned requirement, and also the temporal change of the viscosity after the paste adjustment were extremely small and stable. It is thought that compared to CMC, xanthan gum is superior in alkali resistance and oxidation resistance, an active material paste that possesses the stable viscosity for long time can be obtained even in the active material particle that consists of Lithium, and also the active material paste applying highly oxidizing active material particle having high-order cobalt compound on the surface with high-order nickel hydroxide as its core layer. Also, though xanthan gum was used in the example, even when wellan gum was used instead of xanthan gum, an active material paste whose temporal change in viscosity is as small as when xanthan gum is used was obtained.

The Second Embodiment

The second Embodiment stated here is the process before producing the nickel electrode which is a method to perform the oxidation treatment of the particle that mainly consists of nickel hydroxide and Li impregnation treatment in one process (See Example 8 above). In this case, an active material whose lithium content ratio is a certain value can be obtained by setting a constant treatment condition such as the temperature of the reaction bath (Li impregnation and oxidation treatment solution) to perform oxidation treatment onto the active material particle for nickel electrode, LiOH concentration and treatment duration that is in the Li impregnation and oxidation solution. Also, by containing LiOH in the electrolysis to perform oxidation treatment on active material particle for the nickel electrode, the electrolytic oxidation of the particle and the impregnation of Li into the particle can be performed at the same time.

Other than LiOH, NaOH or KOH can be co-exist in the Li impregnation and oxidation treatment solution.

In producing active material particle for the nickel electrode relevant to the present invention, in the process of oxidizing particle that mainly consists of $Ni(OH)_2$ or particle that mainly consists of $Ni(OH)_2$ with a formed surface layer that mainly consists of low-order cobalt compound such as $Co(OH)_2$, on the surface using an oxidant in the presence of alkaline solution, by adding LiOH into the reaction bath for oxidation, Li can be oxidized and impregnated (as solid solution) into the particle at the same time. By this method, it is preferable as Li can be impregnated without an additional new process.

Example 27

Synthesis of Nickel Hydroxide Particle

An amine complex was produced by adding ammonium sulfate and potassium hydroxide solution into the solution of nickel sulfate, zinc sulfate and cobalt sulfate whose metal hydroxide mass ratio is described below. Furthermore, potassium hydroxide solution was dropped during the reaction system was vigorously stirred with controlling the reaction bath temperature at 45±2° C., pH at 12±0.2, and then sphere type high density particle (hereinafter referred simply as "nickel hydroxide particle") that mainly consists of nickel hydroxide whose average particle diameter is 10 μm and the metal equivalent mass ratio is Ni:Zn:Co=t 91:4:5 was obtained.
(Surface Layer Forming Process)

10 g of the obtained nickel hydroxide particle was added to the 400 ml of alkaline solution controlled with pH 12±0 using NaOH. A solution with specified concentration of cobalt sulfate and ammonium was dropped during the agitation of the above-mentioned solution. During this time, NaOH solution was dropped properly and the temperature of the reaction bath was maintained in the range of 45±2° C. and the pH 12±0.2. The solution was kept with the temperature of 45±2° C., and the pH at 12±0.2 for about one hour, and a surface layer that consists of complex hydroxides containing Co on the surface of the nickel hydroxide particle. The obtained particle was dropped into NaOH solution of the temperature of 100° C. and the concentration of 35 wt %, and maintaining the same temperature, kept agitating for one hour. After the filtration of the sodium hydroxide solution, it was rinsed in water and dried. The ratio of the obtained surface layer of the complex hydroxide particle was 7 wt % against the core layer mother particles (hereinafter referred simply as "core layer").
(Oxidation Treatment of Active Material Particle and Li Impregnation Treatment)

100 g of the particle after the surface layer formation was dispersed in 400 g of the NaOH solution with the concentration of NaOH as 4.5 mol/l, and heated so that the temperature of the dispersed solution would be 50° C. While agitating the dispersed solution, 30 ml of sodium hypochlorite solution was added, and kept agitating for 3 hours. During that time, the temperature of the solution was maintained at 50° C. Then, the solution was heated and the temperature of the dispersed solution at 90° C. was maintained for one hour. After filtering the particle from the solution, the obtained particle was rinsed in water in the same procedure as Example 1 until the pH of the supernatant solution got pH11 with the decantation method, and dried. The Li content ratio and the average oxidation number of Ni and Co contained in the active material particle were calculated in the same method as in Example 1. The calculated average oxidation number of Ni and Co of the obtained active material particle was 2.15, and the Li content ratio was 0.2 wt %. A base plate for a nickel electrode was produced by applying the active material particle for the nickel electrode in the same method as Example 1. The base plate was cut for the nickel electrode and the cylindrical type nickel hydride battery was composed in the same method as Example 1. This example is called as Example 27.

The Third Embodiment

The third embodiment stated here is a method to impregnate Li in to the active material particle by putting Li in the active material paste beforehand, using active material particle (that may have a surface layer that mainly consists of high-order cobalt compound on the surface) that mainly consists of high-order nickel hydroxide whose oxidation number of nickel is higher than +2 in the process of producing the nickel electrode (See Example 9 above). By dissolving lithium hydroxide in the electrolysis beforehand, lithium can be penetrated into the active material particle, however, because of the low solubility of lithium hydroxide against the electrolysis and the limited amount of the electrolysis to be injected in the battery, there is a defect such as the specified enough lithium amount cannot be secured. On the contrary, by adding and dissolving lithium hydroxide in the paste beforehand, a sufficient amount of lithium can be secured. Also, as the penetration of lithium into the particles is facilitated in the heating and drying process after spreading the paste, there is an advantage that electrode can be produced without additional new process.

Example 28

In Example 1, an active material particle (complex oxide particle: a particle that consists of a core layer of high-order nickel hydroxide and a surface layer of high-order cobalt compound) to which lithium was not impregnated beforehand was used in the process of producing the nickel electrode. An active material paste mixed by the active material particle, 0.6 wt % of Xanthan gum, solution that contains 3 wt % of LiOH, and dispersed solution of polytetra-fluoroethylene powder of 40 wt % as solid content ratio whose carrier fluid is water; with the mass ratio of 76.7:22.9:0.4 was obtained. After filling the paste in foamed nickel in the same method as Example 1, it was maintained in the air atmosphere at the ambient temperature of 100° C. for 3 hours and dried. After the drying, the same as in Example 1, it was pressurized in the same method as Example 1 and the base plate for nickel electrode was obtained.

The aforementioned base plate for the nickel electrode was cut, and a sampling of the active material particle was performed. The active material particle obtained in the sampling was rinsed in water until the pH of the supernatant solution got 11 with the decantation method, and dried. Then, the ratio of the lithium contained in the active material particle was calculated, which was 0.22%. The base plate for the nickel electrode was cut, and the cylindrical type nickel hydride secondary battery was obtained as same as in Example 1. This example is called as Example 28.

The Forth Embodiment

The fourth embodiment stated here is a method to impregnate lithium into the active material particle after spreading the active material paste onto the electrically conductive base plate and drying (See Example 11 above). This method has an advantage that it can control the lithium content amount in the active material easily by controlling the lithium hydroxide density in the impregnating solution and the amount of the impregnating solution.

In Example 29 described below, an electrode plate was produced using the complex oxide particle with oxidation treated, however, the complex hydroxide compound can also be oxidized into complex oxide by electrolytic oxidation of the electrode plate after producing the electrode plate using complex hydroxide particle without oxidation treatment.

Example 29

The same as in Example 28, in Example 1, the paste that was obtained applying the active material particle (complex particle) that was not impregnated with Li in the process of producing the nickel electrode was filled into the foamed nickel, and then dried. After the electrode plate was dried, 5 wt % of lithium hydroxide solution was spread and impregnated onto the electrode plate with the amount of 2.5 g per 100 $cm^2$ and then maintained in the air atmosphere of 60° C. for 3 hours, and after drying, it was pressurized and a master plate for nickel electrode was obtained.

The aforementioned master plate for the nickel electrode was cut, and a sampling of the active material particle was performed. The active material particle obtained in the sampling was rinsed in water until the pH of the supernatant solution got 11 with the decantation method, and dried. Then, the ratio of the Li contained in the active material particle was calculated, which was 0.24%. The master plate for the nickel electrode was cut, and the cylindrical type nickel hydride secondary battery was obtained as same as in Example 1. This example is called as Example 29.

Table 9 shows the test results of the cylindrical type nickel-hydride secondary battery.

TABLE 9

| Classification | Lithium adding method | Li content ratio (wt %) | Inner press. charged at 20° C. (MPa) | Discharge capacity Discharged at 20° C. (mAh) | Discharged at 60° C. (mAh) | Charge efficiency at 60° C. (%) | Cycle life (no of cycles) | Cycle life 40° C. charge efficiency (%) |
|---|---|---|---|---|---|---|---|---|
| Example 27 | Added and dissolved in oxidizing bath | 0.20 | 0.5 | 2118 | 1292 | 61.0 | 425 | 96 |
| Example 28 | Added and dissolved in active material paste | 0.22 | 0.5 | 2122 | 1305 | 61.4 | 430 | 98 |
| Example 29 | Spreading & impregnating solution onto polar plate | 0.24 | 0.5 | 2127 | 1296 | 60.9 | 410 | 98 |

As shown in Table 9, each of Examples 27 to 29 is superior to Example 1 in which active material for the nickel electrode does not contain Li, in both discharge capacity and cycle life; and compared to Example 1 in which Li impregnation treatment was performed to active material of the nickel electrode that mainly consists of already formed high-order nickel hydroxide, it was confirmed that it has characteristics not inferior to Example 1. It was found that each of the Li adding method to active material of nickel electrode shown in Examples 27 to 29 is effective.

The Fifth Embodiment

In the fifth Embodiment stated here, in the above third Embodiment, instead of LiOH in active material paste, at least one kind of compound of Li carbonate ($Li_2CO_3$), hydrosulfate ($Li_2SO_4$), nitrate salt ($LiNO_3$), phosphate ($Li_3PO_4$), acetate ($CH_3COOLi$) or halogen compounds (LiF, LiCl, LiBr) is added. As thickening agent for active material of the nickel electrode, other than carboxymethyl cellulose (CMC) and methyl cellulose (MC), polysaccharide such as xanthan gum and wellan gum can be applied. Among these, CMC and MC are inferior in alkali resistance, the thickening agent gets decomposed in a system alkaline co-exists, and the temporal change of the paste viscosity is large. As xanthan gum and wellan gum are superior in alkali resistance compared to CMC and MC, the temporal change of the paste viscosity is inhibited, however, in case leaving the paste abandoned for a long time, it is inevitable the viscosity deteriorates. If the viscosity of the paste deteriorates, there is a tendency that the paste runs down the base plate and the active material filled amount goes small in the attempt of drying the base plate filled with the paste, and there also is a tendency that the solid content gets sedimentation separation, resulting in a large variation of active material filled amount. In case of using the Li salt solution that is either slightly acidic or slightly alkaline instead of LiOH which is strongly alkaline as a test reagent to impregnate Li, the temporal decrease of viscosity of the active material paste can be inhibited.

Example 30

In Example 28, in the process of producing the nickel electrode, instead of single use of active material particle (complex hydroxide particle) for the nickel electrode, the mixed particle of 98 parts by weight of the active material particle and 2 parts by weight of erbium hydroxide {Er$(OH)_3$} were applied. Other than that, the nickel electrode was produced in the same method as Example 28.

The aforementioned base plate for the nickel electrode was cut, and a sampling of the mixed particle of active material particle and erbium hydroxide was performed. The active material particle obtained in the sampling was rinsed in water until the pH of the supernatant solution got 11 with the decantation method, and dried. Then, the ratio of the Li contained in the mixed particle was calculated, which was 0.2%. The base plate for the nickel electrode was cut, and the cylindrical type nickel hydride secondary battery was obtained as same as in Example 28. Also, the discharge capacities charged at 20° C. and 60° C. and charge efficiency at 60° C. were calculated. This example is called as Example 30.

Example 31

In Example 30, instead of solution that contains 0.6 wt % of xanthan gum and 3 wt % of LiOH, solution of 0.6 wt % of xanthan gum and 6 wt % of $Li_2SO_4$ were applied. Other than that, the nickel electrode was produced in the same method as Example 30. The ratio of the Lithium contained in the mixed particle was calculated as same as Example 30, which was 0.2%. The base plate for the nickel electrode was cut, and the cylindrical type nickel hydride secondary battery was obtained as same as in Example 30. Also, the discharge capacities charged at 20° C. and 60° C. and charge efficiency at 60° C. were calculated. This example is called as Example 31.

Example 32

In Example 30, instead of solution that contains 0.6 wt % of xanthan gum and 3 wt % of LiOH, solution of 0.6 wt % of xanthan gum and 5 wt % of $Li_2SO_4$ were applied. Other than that, the nickel electrode was produced in the same method as Example 30. The ratio of the Lithium contained in the mixed particle was calculated as same as Example 30, which was 0.2%. The base plate for the nickel electrode was cut, and the cylindrical type nickel hydride secondary battery was obtained as same as in Example 30. Also, the discharge capacities charged at 20° C. and 60° C. and charge efficiency at 60° C. were calculated. This example is called as Example 32.

Table 10 shows the test results of the battery relevant to Examples 30 to 32.

TABLE 10

| Classification | Li content ratio (wt %) | Discharge capacity Charged at 20° C. (mAh) | Discharge capacity Charged at 60° C. (mAh) | Charge efficiency charged at 60° C. (%) |
|---|---|---|---|---|
| Example 30 | 0.2 | 2245 | 1620 | 72.2 |
| Example 31 | 0.2 | 2251 | 1632 | 72.5 |
| Example 32 | 0.2 | 2258 | 1642 | 72.7 |

As shown in Table 10, also in Example 31 and Example 32, the results that show not inferior to that of Example 30 were obtained in both in discharge capacity and charge efficiency at 60° C., and it was confirmed that using $Li_2SO_4$ or LiCl instead of LiOH as Li impregnating test reagent can be obtained the same effect as using LiOH.

Figure 10:
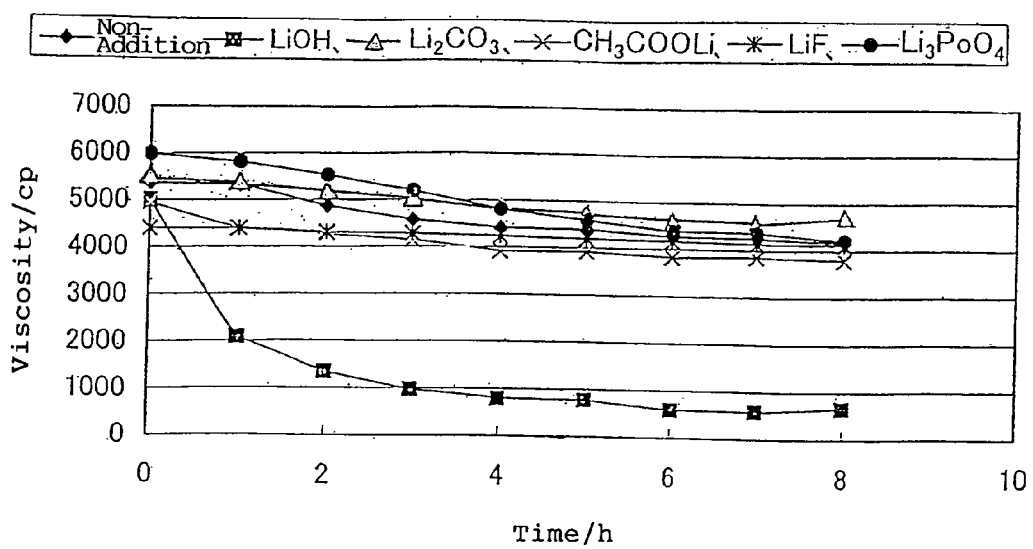
FIG. 10 is a graph of the temporal change of the viscosity of the active material paste for the nickel electrode of the present invention in the ambient temperature of 20° C.

Using B type viscometer, the viscosity of active material paste of Examples 30 to 32, and the active material pastes without Li impregnation reagent using $Li_2CO_3$, $CH_3COOLi$, $LiNO_3$, LiBr, LiF, or $Li_3PO_4$ instead of LiOH, $Li_2SO_4$, and LiCl as Li impregnation reagent after the left at the ambient air temperature of 20° C. were measured since the production of the paste over time. FIG. 10 shows the active material viscosity without Li impregnation reagent using LiOH, $Li_2CO_3$, $CH_3COOLi$, LiF, or $Li_3PO_4$ as Li impregnation reagent. As shown in FIG. 10, it was confirmed that while the paste using LiOH as Li impregnation test reagent showed a significant decrease in viscosity over time, the paste using $Li_2CO_3$, $CH_3COOLi$, LiF, or $Li_3PO_4$ showed an extremely small decrease in viscosity, and the viscosity was stable for a long period of time. Though it is not shown in FIG. 10, when $Li_2SO_4$, $LiNO_3$, LiCl, or LiBr was used as Li impregnation reagent, the similar result was obtained the same as in using LiF, or $Li_3PO_4$, that the temporal decrease of paste viscosity was inhibited.

Also, the active material pastes of Examples 30 to 32 was left in the ambient temperature of 20° C. for 3 hours, and stirred so that the paste composition should be uniform, and then 200 positive electrodes were produced using the paste, and the degree of the variation in the filled amount of the active material was studied. Though the detail results are omitted here, while the difference of the minimum and maximum of the filling capacity of the active material was 5% when the active material paste of Example 30 was used, in Example 31 and Example 32, the difference was less than 1% and the result of small difference in the filling amount was obtained. It is thought that while in case of Example 1, when the paste was left for 3 hours, as the paste viscosity was decreased and the separation of solid and liquid occurred in the paste, the variation among the filling amounts of active material was increased, in Example 31 and Example 32, as the viscosity of active material paste was hardly decreased, the separation of solid and liquid did not occur easily, resulting electrode with a stable filling amount. In the manufacturing process of nickel electrodes as in Example 28 and Examples 30 to 32, as the nickel electrodes were produced immediately after producing the active material paste, the variation of the filling amount in the nickel electrode did not get large, however, in case there would be a situation where it cannot prevent that the active material paste should be left before the nickel electrode is produced after producing the active material paste in time of mass production, while there is a possibility that a large variation might occur in the filled amount of the active material if LiOH is used as Li impregnation reagent, it is confirmed that using the aforementioned Li salt instead of LiOH, the variation in the filled amount of active material will be inhibited.

The Sixth Embodiment

In the sixth Embodiment stated here, in the aforementioned fourth Embodiment, as Li compound to be impregnated into nickel electrode, at least one kind of the compound of $Li_2CO_3$, $Li_2SO_4$ $Li_3PO_4$, $CH_3COOLi$, LiF, LiCl, and LiBr instead of LiOH is impregnated. Also, out of these compounds, applying $Li_2SO_3$, $Li_3PO_4$, $CH_3COOLi$, LiF, LiCl, or LiBr is preferable as there is no tendency of decreasing of the conductivity of the electrolysis or facilitating the self-discharge.

Example 33

In Example 29, in the process of producing the nickel electrode, instead of single use of active material particle (complex hydroxide particle) for the nickel electrode, the mixed particle of 98 parts by weight of the active material particle and 2 parts by weight of erbium hydroxide {Er(OH)$_3$} were applied. Other than that, the cylindrical type nickel hydride battery was produced in the same method as Example 29, and the discharge capacities charged at 20° C. and 60° C. and charge efficiency at 60° C. were calculated. This example is called as Example 33.

Example 34

In Example 33, instead of 5 wt % solution of lithium hydroxide, 10 wt % $Li_2SO_4$ solution was applied. Other than that, the cylindrical type nickel hydride battery was produced in the same method as Example 33, and the discharge capacities charged at 20° C. and 60° C. and charge efficiency at 60° C. were calculated. This example is called as Example 34.

Example 35

In Example 33, instead of 5 wt % solution of lithium hydroxide, 7 wt % $Li_2SO_4$ solution was applied. Other than that, the cylindrical type nickel hydride battery was produced in the same method as Example 33, and the discharge capacities charged at 20° C. and 60° C. and charge efficiency at 60° C. were calculated. This example is called as Example 35.

Table 11 shows the test results of batteries relevant to Examples 33 to 35. Also, the weight changes of electrode plate relevant to Examples 33 to 35 after drying and leaving the nickel electrode plates at the same time in the temperature of 25° C., relative humidity of 70% RH for one night (for 15 hours).

TABLE 11

| Classification | Li content ratio (wt %) | Discharge capacity Charged at 20° C. (mAh) | Discharge capacity Charged at 60° C. (mAh) | Charge efficiency charged at 60° C. (%) |
| --- | --- | --- | --- | --- |
| Example 33 | 0.24 | 2236 | 1620 | 72.0 |
| Example 34 | 0.24 | 2241 | 1622 | 72.4 |
| Example 35 | 0.24 | 2242 | 1620 | 72.3 |

As shown in Table 11, the same as in the aforementioned Embodiment 5, it is confirmed that superior results can be obtained in discharge capacity charged at 20° C. and 60° C., and charge efficiency at 60° C. when $Li_2SO_4$ and LiCl are used as Li impregnation reagent instead of LiOH as same as when LiOH is used.

Also, while the weight increase of the electrode plate was recognized when the electrode plate relevant to Example 33 was left in the air atmosphere after drying, possibly because of the humidity absorption and carbon dioxide absorption, the weight change of the electrode plates relevant to Example 34 and Example 35 was hardly recognized when the electrode plates relevant to Example 34 and Example 35 were left in the air atmosphere after drying. In Examples 33 to 35, as the batteries were assembled immediately after producing the nickel electrodes without leaving in the air, battery characteristics were not affected by the nickel electrodes being left in the air, however, when the electrodes are left in the air atmosphere, there is a possibility that absorption of humidity or carbon dioxide by electrodes might change the density of electrolysis after assembling of the batteries, therefore, it is not very preferable.

In addition, as examples of Embodiment 5 and Embodiment 6, examples of using $Li_2SO_4$ solution and LiCl solution as impregnation reagent were shown, however, using the solution of $Li_2CO_3$, $CH_3COOLi$, LiF, LiBr, or $Li_3PO_4$, also gives the result as superior as using $Li_2SO_4$ solution and LiCl solution.

In the above examples, as a lithium impregnation method into the active material powder for the nickel electrode, a method heating the active material powder after soaking in the solution that contains alkaline metal ion, a method using oxidation bath with dissolved lithium hydroxide, in the process of oxidation of active material for nickel electrode using oxidant in the presence of alkaline solution, a method adding alkaline metal element to the paste in the process of producing active material paste, and a method impregnating a solution that contains alkaline metal ion into the nickel electrode plate, but other than these, a method adding alkaline metal ion into the reaction bath to deposit active material for nickel electrode that mainly consists of nickel hydroxide can be applied as well.

In addition, the nickel electrode for alkaline secondary battery in the present invention is preferably set as containing a range from 2 to 4 wt % of zinc in the active material particle. In examples above, the zinc content amount is within this range. This range has been determined based on the test results that the effect of adding zinc is not sufficient when the content rate is less than 2 wt %, and that the utilization rate of the active material decreases extremely when the content amount is over 4 wt %.

INDUSTRIAL APPLICABILITY

The present invention serves to improve the discharge capacity, high-rate discharge characteristics, and charge/discharge cycle life of nickel electrode for nickel hydride secondary battery and nickel cadmium battery and the like, and has a high commercial utilization value.

The invention claimed is:

1. A nickel electrode for an alkaline secondary battery, comprising:
   an electrically conductive base plate, and
   an active material particle supported on the conductive base plate and comprising a complex particle with a surface layer that comprises a high-order cobalt compound whose oxidation number of cobalt is higher than +2 on a surface of a core layer particle that comprises a high-order nickel hydroxide whose oxidation number of nickel is higher than +2;
   wherein lithium (Li) is contained to be a solid solution in said cobalt compound that forms the surface layer and the nickel hydroxide that forms the core layer, from 0.01 to 0.5 wt % of a converted amount as a lithium metal by weight of lithium metal divided by a total weight of the high-order nickel hydroxide, the high-order cobalt compound and the lithium metal.

2. A nickel electrode for an alkaline secondary battery according to claim 1, wherein said active material particle contains a rare earth element compound comprising at least one kind of element selected from the element group of holmium (Ho), erbium (Er), thulium (Tm), ytterbium (Yb), and lutetium (Lu).

3. A nickel electrode for an alkaline secondary battery according to claim 2, wherein said rare earth element compound comprising at least one kind of element selected from the element group of holmium (Ho), erbium (Er), thulium (Tm), ytterbium (Yb), and lutetium (Lu) is a compound having inherent diffraction peaks at d=0.88 nm, d=0.84 nm, and d=0.76 nm in the X-ray diffraction using Co—Kα line.

4. A nickel electrode for an alkaline secondary battery according to claim 1, wherein said active material particle contains at least one kind element selected from calcium (Ca) and magnesium (Mg), and wherein in case the active material contains at least one kind of calcium and magnesium, a value of denomination of a fraction contains a weight of the at least one kind of calcium and magnesium.

5. A nickel electrode for an alkaline secondary battery according to claim 2, wherein said active material particle contains at least one kind element selected from calcium (Ca) and magnesium (Mg), and wherein in case the active material contains at least one kind of calcium and magnesium, a value of denomination of a fraction contains a weight of the at least one kind of calcium and magnesium.

6. A nickel electrode for an alkaline secondary battery according to claim 1, wherein a natural polysaccharide comprising glucose, mannose and glucuronic acid is contained or a natural polysaccharide comprising glucose, mannose, rhamnose, and glucuronic acid is contained with said active material particle.

7. A nickel electrode for an alkaline secondary battery according to claim 2, wherein a natural polysaccharide comprising glucose, mannose and glucuronic acid is contained, or a natural polysaccharide comprising glucose, mannose, rhamnose, and glucuronic acid is contained with said active material particle.

8. An alkaline secondary battery comprising the nickel electrode for alkaline secondary battery according to claim 1.

9. A nickel electrode for an alkaline secondary battery according to claim 1, wherein a percentage of the high-order cobalt compound in said surface layer in the active material at the nickel electrode is 3 to 10 wt.%.

10. A nickel electrode for an alkaline secondary battery according to claim 1, wherein the cobalt compound that forms said surface layer contains Li.

11. A nickel electrode for an alkaline secondary battery according to claim 1, wherein the percentage of Lithium (Li) in the active material at the nickel electrode is 0.05 to 0.5 wt. %.

* * * * *